(12) United States Patent
Sims et al.

(10) Patent No.: US 10,233,745 B2
(45) Date of Patent: Mar. 19, 2019

(54) METHODS, APPARATUS, AND SYSTEMS FOR STEAM FLOW PROFILING

(71) Applicant: Chevron U.S.A. Inc., San Ramon, CA (US)

(72) Inventors: Jackie C. Sims, Houston, TX (US); Richard Scot Buell, Bakersfield, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 306 days.

(21) Appl. No.: 15/080,194

(22) Filed: Mar. 24, 2016

(65) Prior Publication Data

US 2016/0281456 A1 Sep. 29, 2016

Related U.S. Application Data

(60) Provisional application No. 62/138,894, filed on Mar. 26, 2015, provisional application No. 62/199,068, (Continued)

(51) Int. Cl.
| | |
|---|---|
| *E21B 33/12* | (2006.01) |
| *E21B 41/00* | (2006.01) |
| *E21B 43/24* | (2006.01) |
| *E21B 47/06* | (2012.01) |
| *E21B 44/00* | (2006.01) |
| *E21B 47/00* | (2012.01) |

(Continued)

(52) U.S. Cl.
CPC ............ *E21B 47/065* (2013.01); *E21B 33/12* (2013.01); *E21B 41/0078* (2013.01); *E21B 43/24* (2013.01); *E21B 44/00* (2013.01); *E21B 47/00* (2013.01); *E21B 47/06* (2013.01); *G06F 17/11* (2013.01); *G06F 17/5009* (2013.01); *E21B 17/00* (2013.01); *G06F 2217/16* (2013.01)

(58) Field of Classification Search
CPC .. E21B 43/24; E21B 41/0078; E21B 43/2406; E21B 33/12; E21B 33/1208; E21B 33/128
See application file for complete search history.

(56) References Cited

U.S. PATENT DOCUMENTS 3,375,703 A * 4/1968 Phillips ............... E21B 47/1025
73/40.5 R
3,666,010 A * 5/1972 Harris ................ E21B 33/1208
166/123

(Continued)

FOREIGN PATENT DOCUMENTS

CN 101338660 1/2009
WO 2005/035944 A1 4/2005

(Continued)

OTHER PUBLICATIONS

Taitel, Yemada, et al.; "A Model for Predicting Flow Regime Transitions in Horizontal and Near Horizontal Gas-Liquid Flow"; AIChE Journal, vol. 22, No. 1, Jan. 1976, pp. 47-55.

(Continued)

*Primary Examiner* — Daniel P Stephenson

(57) ABSTRACT

Provided herein are embodiments of sealing assemblies for packers and wellbore assemblies for use in the injection of steam into a formation. Usage of one or more of these items may increase recovery of hydrocarbon from the formation.

23 Claims, 12 Drawing Sheets

Related U.S. Application Data filed on Jul. 30, 2015, provisional application No. 62/269,740, filed on Dec. 18, 2015.

(51) Int. Cl.
*G06F 17/11* (2006.01)
*G06F 17/50* (2006.01)
*E21B 17/00* (2006.01)

(56) References Cited

U.S. PATENT DOCUMENTS

| | | | |
|---|---|---|---|
| 3,965,975 A | 6/1976 | Edmundson | |
| 4,046,100 A | 9/1977 | Kuonen et al. | |
| 4,046,199 A | 9/1977 | Tafoya | |
| 4,062,524 A * | 12/1977 | Brauner | B01F 5/0619 138/37 |
| 4,326,588 A * | 4/1982 | McStravick | E21B 33/1208 166/124 |
| 4,433,847 A * | 2/1984 | Weinberg | E21B 33/1208 277/342 |
| 4,648,455 A | 3/1987 | Luke | |
| 4,720,113 A * | 1/1988 | Hertz, Jr. | F16J 15/20 277/342 |
| 4,800,921 A | 1/1989 | Greebe | |
| 5,141,054 A | 8/1992 | Alameddine et al. | |
| 5,413,180 A * | 5/1995 | Ross | E21B 23/06 166/194 |
| 5,709,468 A | 1/1998 | Woerheide et al. | |
| 5,826,655 A | 10/1998 | Snow et al. | |
| 6,056,050 A | 5/2000 | Snow et al. | |
| 6,158,510 A | 12/2000 | Bacon et al. | |
| 6,371,210 B1 | 4/2002 | Bode et al. | |
| 6,629,774 B1 * | 10/2003 | Gruendeman | B05C 17/002 222/145.6 |
| 6,708,763 B2 * | 3/2004 | Howard | E21B 41/0078 166/222 |
| 6,820,489 B2 | 11/2004 | Fernald et al. | |
| 7,032,675 B2 | 4/2006 | Steele et al. | |
| 7,350,577 B2 | 4/2008 | Howard et al. | |
| 7,793,716 B2 | 9/2010 | Macias et al. | |
| 8,066,071 B2 | 11/2011 | Sharma et al. | |
| 8,109,340 B2 | 2/2012 | Doane et al. | |
| 8,689,883 B2 | 4/2014 | Kim | |
| 9,022,119 B2 * | 5/2015 | Sims | E21B 43/24 166/303 |
| 9,518,438 B2 | 12/2016 | Sun et al. | |
| 9,790,763 B2 * | 10/2017 | Fripp | E21B 33/12 |
| 2003/0185098 A1 * | 10/2003 | Koch | B01F 5/0475 366/336 |
| 2004/0218469 A1 * | 11/2004 | Unterlander | B01F 5/0645 366/336 |
| 2007/0017673 A1 | 1/2007 | Hurst et al. | |
| 2007/0246226 A1 | 10/2007 | Macias et al. | |
| 2008/0087417 A1 * | 4/2008 | Doane | E21B 33/1208 166/179 |
| 2008/0251255 A1 * | 10/2008 | Forbes | E21B 43/2406 166/305.1 |
| 2009/0114393 A1 | 5/2009 | Sharma et al. | |
| 2009/0182509 A1 | 7/2009 | Kimminau et al. | |
| 2010/0038087 A1 * | 2/2010 | Skillingstad | B05B 1/26 166/302 |
| 2011/0094727 A1 * | 4/2011 | Sims | E21B 43/2406 166/57 |
| 2011/0094728 A1 | 4/2011 | Sims | |
| 2011/0114326 A1 * | 5/2011 | Aubrey | E21B 33/0355 166/338 |
| 2011/0122727 A1 | 5/2011 | Gleitman et al. | |
| 2011/0229071 A1 | 9/2011 | Vincelette et al. | |
| 2012/0184027 A1 * | 7/2012 | Schuessler | C08K 5/45 435/292.1 |
| 2012/0199353 A1 | 8/2012 | Fermaniuk et al. | |
| 2012/0298356 A1 * | 11/2012 | Sladic | E21B 41/0078 166/263 |
| 2013/0120756 A1 | 5/2013 | Spross | |
| 2013/0160996 A1 | 6/2013 | Maier et al. | |
| 2014/0041852 A1 | 2/2014 | Sims | |
| 2014/0041858 A1 | 2/2014 | Sun et al. | |
| 2014/0126325 A1 | 5/2014 | Farhadiroushan et al. | |
| 2014/0196914 A1 | 7/2014 | Ring et al. | |
| 2014/0361497 A1 * | 12/2014 | Porta | E21B 33/1208 277/619 |
| 2016/0010422 A1 * | 1/2016 | Goodman | E21B 33/1208 166/378 |
| 2016/0084033 A1 * | 3/2016 | Anderson | E21B 33/1208 166/387 |
| 2016/0177655 A1 * | 6/2016 | Fripp | E21B 33/12 166/376 |
| 2016/0281456 A1 * | 9/2016 | Sims | E21B 43/24 |
| 2016/0281471 A1 * | 9/2016 | Buell | E21B 43/24 |
| 2016/0281494 A1 | 9/2016 | Shirdel et al. | |
| 2017/0204697 A1 * | 7/2017 | Fripp | E21B 33/1208 |
| 2017/0254176 A1 * | 9/2017 | van Petegem | E21B 34/063 |

FOREIGN PATENT DOCUMENTS

| | | |
|---|---|---|
| WO | 2005/064297 A1 | 7/2005 |
| WO | 2008/142585 A2 | 11/2008 |
| WO | 2010/123566 A1 | 10/2010 |
| WO | 2012/054635 A2 | 4/2012 |
| WO | 2014/158333 A1 | 10/2014 |
| WO | 2015/067931 A2 | 5/2015 |
| WO | 2015/150781 A2 | 10/2015 |

OTHER PUBLICATIONS

Thompson, Scott, et al.; "Well Integrity Evaluation Using Distributed Temperature Sensing (DTS) on an Operating SAGD Injector Well Influenced by Neighboring Steam Chambers"; SPE-174504-MS, Jun. 2015, pp. 1-17.

Xiao, J., et al.; "Dynamic Water Injection Profiling in Intelligent Wells Using Distributed Acoustic Sensor with Multimode Optical Fibers"; SPE-174865-MS, Sep. 2015, pp. 1-9.

Xiao, J., et al.; "Inflow Monitoring in Intelligent Wells Using Distributed Acoustic Sensor"; SPE 167447, Oct. 2013, pp. 1-7.

Xiao, J., et al.; "Intelligent Distributed Acoustic Sensing for In-Well Monitoring"; SPE-172197-MS, Apr. 2014, pp. 1-12.

Extended European Search Report, dated Aug. 5, 2016, during the prosecution of European Application No. 16162453.

International Search Report, dated May 24, 2011, during the prosecution of International Application No. PCT/US2010/053407.

Written Opinion of the International Searching Authority, dated May 24, 2011, during the prosecution of International Application No. PCT/US2010/053407.

Shaw, Joel, et al.; "Using a New Intelligent Well Technology Completions Strategy to Increase Thermal EOR Recoveries—SAGD Field Trial"; WHOC11-582, (2011), pp. 1-8.

Ficocelli, Peter, et al.; "Accuracy and Reliability of a New-Generation Optical PT Gauge in a SAGD Field Trial"; SPE-180758-MS, Jun. 2016, pp. 1-9.

Finfer, D.C., et al.; "Borehole Flow Monitoring Using a Non-Intrusive Passive Distributed Acoustic Sensing (DAS)"; SPE-170844-MS, Oct. 2014, pp. 1-9.

Finfer, D.C., et al.; "Non-Intrusive Multiple Zone Distributed Acoustic Sensor Flow Metering"; SPE-174916-MS, Sep. 2015, pp. 1-9.

Fram, J.H., et al.; "Addressing Horizontal Steam Injection Completions Challenges with Chevron's Horizontal Steam Test Facility"; SPE 132410, May 2010, pp. 12.

Hill, David; "DAS Aids in Permanent Field Monitoring"; Exploration & Production, pp. 1-4, Article.

Hiscock, B., et al.; "Methodology for In-Well DTS Verifications in SAGD Wells"; SPE-174487-MS, Jun. 2015, pp. 1-18.

Horst, Juun van der, et al.; "Latest Developments Using Fiber Optic Based Well Surveillance Such as Distributed Acoustic Sensing (DAS) for Downhole Production and Injection Profiling"; SPE-175211-MS, Oct. 2015, pp. 1-10.

(56) References Cited

OTHER PUBLICATIONS

Hwang, S.T., et al.; "Phase Separation in Impacting Wyes and Tees"; 1989, Int. J. Multiphase Flow, vol. 15, No. 6, pp. 965-975.

Johannessen, Kjetil, et al.; "Distributed Acoustic Sensing—A New Way of Listening to Your Well/Reservoir"; SPE 149602, Mar. 2012, pp. 1-9.

Krawchuk, P., et al.; "Predicting the Flow Distribution on Total E&P Canada's Joslyn Project Horizontal SAGD Producing Wells Using Permanently Installed Fibe-Optic Monitoring"; SPE 102159, Sep. 2006, pp. 1-14.

MacPhail, Warren, et al.; "SAGD Production Observations Using Fiber Optic Distributed Acoustic and Temperature Sensing: SAGD DAS—Listening To Wells To Improve Understanding of Inflow"; SPE-180726-MS, Jun. 2016, pp. 1-20.

Molenaar, Mathieu M., et al.; "Field Cases of Hydraulic Fracture Stimulation Diagnostics Using Fiber Optic Distributed Acoustic Sensing (DAS) Measurements and Analyses"; SPE 164030, Jan. 2013, pp. 1-10.

Nath, D.K., et al; "Fiber-Optic Distributed-Temperature-Sensing Technology Used for Reservoir Monitoring in an Indonesia Steamflood"; Jun. 2007, SPE Drilling & Completion, pp. 149-156.

Panhuis, Peter in't, et al.; "Flow Monitoring and Production Profiling Using DAS"; SPE-170917-MS, Oct. 2014, pp. 1-11.

Parker, Tom, et al.; "Distributed Acoustic Sensing—A New Tool for Seismic Applications"; *First Break*, vol. 32, Feb. 2014, pp. 61-69.

Rahman, Mahmood, et al.; "Application of Fiber-Optic Distributed Temperature Sensing Technology for Monitoring Injection Profile in Belridge Field, Diatomite Reservoir"; 2011, SPE 144116, pp. 1-13.

Sanghvi, G., et al.; "DAS Acquisition in a Matured Field During 4D: A Challenging Initiative with Mutliple Objectives"; SPE-177691-MS, Nov. 2015, pp. 1-12.

Seeger, W., et al.; "Two-Phase Flow in a $T$-Junction With a Horizontal Inlet"; 1986, Int. J. Multiphase Flow, vol. 12, No. 4, pp. 575-585.

Allanic, C., et al.; "Distributed Acoustic Sensing for ESP Understanding and Surveillance"; SPE 167501, Oct. 2013, pp. 1-10.

Becker, Matthew W., et al.; "Measuring Hydraulic Connection in Fractured Bedrock with Periodic Hydraulic Tests and Distributed Acoustic Sensing"; Proceedings, 41$^{st}$ Workshop on Geothermal Reservoir Engineering, Feb. 2016, pp. 1-11.

Boone, Thomas J., et al.; "Targeted Steam Injection Using Horizontal Wells with Limited Entry Perforations"; SPE 50429, Nov. 1998, pp. 1-10.

Buell, R. Scot, et al.; "Integrity Assessment of Thermal Horizontal Well Liners Using Torque and Drag"; SPE 178471-MS, Nov. 2015, pp. 1-11.

Cannon, Robert, et al.; "Distributed Acoustic Sensing: State of the Art"; SPE 163688, Mar. 2013, pp. 1-10.

Chien, Sze-Foo; "Phase Splitting Of Wet Steam in Annular Flow Through a Horizontal Branching Tree"; SPE Production & Facilities, May 1996, pp. 83-88.

Chiou, R.C.S., et al.; "Field Performance of Steam Injection Profile Control Using Limited-Entry Perforation"; SPE 24081, SPE Western Regional Meeting, Mar. 10 through Apr. 1, 1992, pp. 1-20, with 13 figures.

Danardatu, Hera, et al.; "Data Application and Processing of Carbon Rod Conveyed DTS and DAS in Very Long Horizontal Wells: First Trial in North Sea Danish Sector"; SPE-170663-MS, Oct. 2014, pp. 1-18.

* cited by examiner

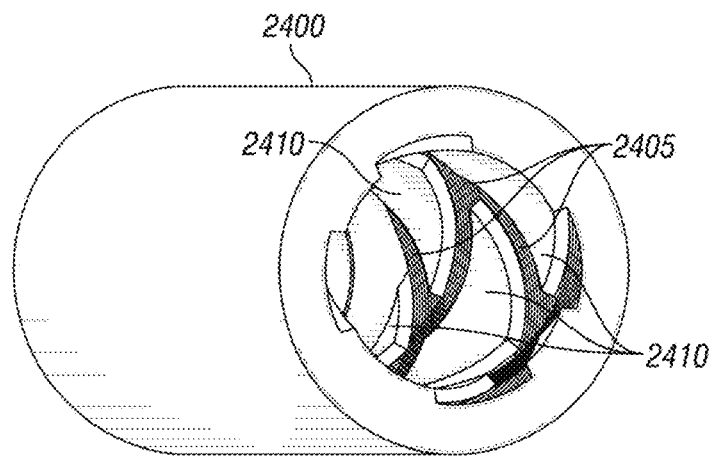
FIG. 24
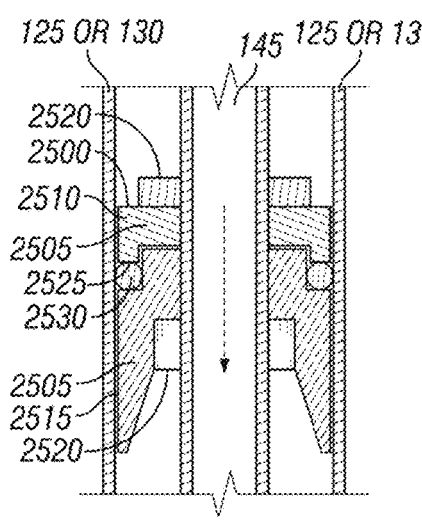 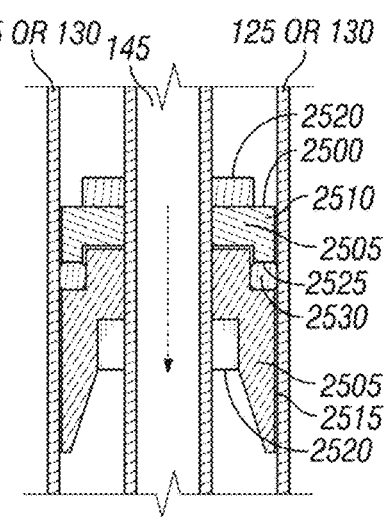
FIG. 25    FIG. 26

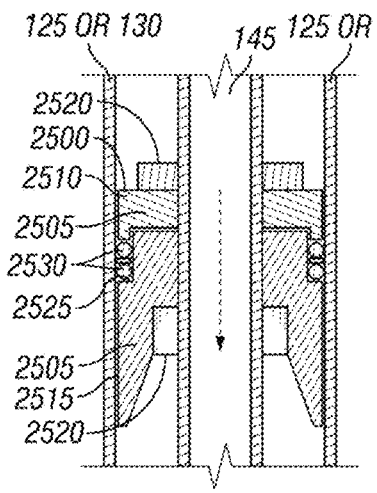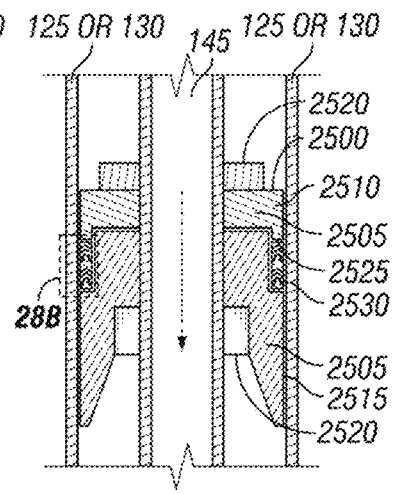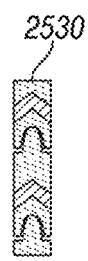
FIG. 27　　FIG. 28A　　FIG. 28B
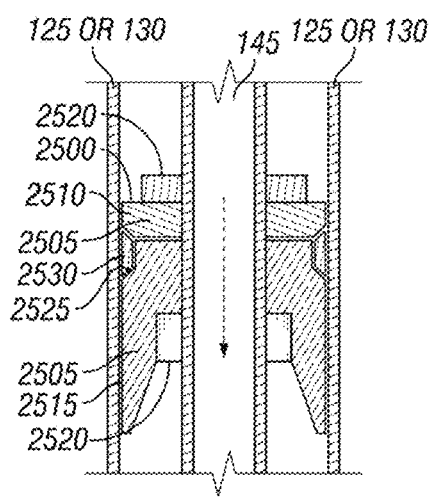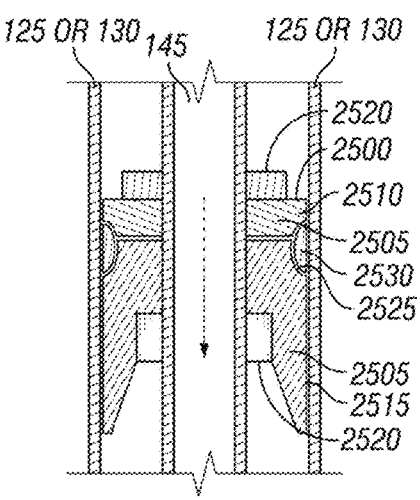
FIG. 29　　FIG. 30

METHODS, APPARATUS, AND SYSTEMS FOR STEAM FLOW PROFILING

CROSS REFERENCES TO RELATED APPLICATIONS

This application claims benefit under 35 USC 119 of U.S. Provisional Patent App. No. 62/138,894 with a filing date of Mar. 26, 2015, which is incorporated herein by reference in its entirety and for all purposes. This application claims benefit under 35 USC 119 of U.S. Provisional Patent App. No. 62/199,068 with a filing date of Jul. 30, 2015, which is incorporated herein by reference in its entirety and for all purposes. This application claims benefit under 35 USC 119 of U.S. Provisional Patent App. No. 62/269,740 with a filing date of Dec. 18, 2015, which is incorporated herein by reference in its entirety and for all purposes.

TECHNICAL FIELD

The present disclosure relates to methods, systems, and apparatuses for steam injection for hydrocarbon recovery. More particularly, the present disclosure relates to flow control devices, mixers, and sealing assemblies for packers for use in steam injection for hydrocarbon recovery.

BACKGROUND

Steam flooding, as a thermal enhanced oil recovery (EOR) process, has been introduced in heavy (5°-20° API) oil fields with high potential of recovery factor in relatively shallow and depleted formations. Heavy oils always have high viscosities that are 100 cp or greater in situ. Steam, through its latent heat, reduces the viscosity of the oil and makes the oil move toward the production wellbores such as by gravity drainage and viscous forces.

In thermal hydrocarbon production steam flooding operations, steam is typically generated above the ground and may be used to provide steam to one or several wells (e.g., injection wells, production wells undergoing cyclic steaming, etc.) at once. A plurality of tubulars (e.g., conduits) are installed within each well to deliver steam into the hydrocarbon bearing formation. Tubulars are inclusive of casing, liner, tubing, and conductor which are all different sizes of pipes for different oilfield wellbore applications. The wells may have a vertical, inclined, horizontal, or combination trajectories to deliver steam to the formation. Flow control devices are deployed in the plurality of tubulars to distribute steam. There are two primary methods of conformance (heat and flow) control: 1) tubing-deployment and 2) liner or casing deployment.

Tubing deployment (1) has flow control devices integrally connected to the tubing and the tubing is deployed inside casing or liner. For tubing deployment, steam exits the tubing via a tubing deployed flow control device(s) and enters the tubing-liner annulus. After entering the tubing-liner annulus, the steam then passes through the liner and enters the open hole or formation. Packers may be used with tubing deployment to direct and control the steam movement into the formation.

Liner or casing deployment (2) has flow control devices integrally connected to the liner or casing, and the liner and casing is deployed in open hole. For liner or casing deployment, steam is delivered with open-ended tubing (i.e. without flow control devices) into the liner or casing. Steam exits the liner or casing via a liner or casing deployed flow control device and enters the formation or open hole.

The flow control devices support uniform and/or targeted distribution of heat from the tubing into either the tubing-liner-annular space or formation. A plurality of packers may also be installed on the tubulars to effect hydraulic isolation of various wellbore segments in either the tubing-liner annulus or the liner-open hole annulus. The intent of this hydraulic isolation is the improvement of heat delivery uniformity to the wellbore-formation interface.

However, many factors can negatively affect the function of the steam injection system. For example, conventional flow control devices with large outside diameters increase friction and drag forces when inserting or pulling the tubing in a wellbore, which in turn, may increase the likelihood that the tubing and completion hardware will get stuck in a horizontal section of a wellbore (e.g., due to sand, scale, asphaltenes, etc.) and damaged due to being stuck. These conventional FCDs with large outside diameters also hinder fishing or other equipment recovery operations because they reduce the diametrical clearance available for such operations.

As another example, conventional mixers, which may be coupled to FCDs, lead to non-uniform steam splitting.

As another example, conventional packers may not provide an effective hydraulic seal (e.g., especially when the steam temperature is higher than 300° F.) and may not be able to direct the steam to the targeted portion of the formation or wellbore. Non-uniform heating can substantially impact the economics of the field development, oil production response, and create non-uniform steam breakthrough in the production wellbores. Furthermore, the steam injectors inject the volume of steam at high temperatures (>300° F.), which may result in deterioration of sealing element(s) of packers.

Diagnosis of equipment integrity is crucial to ensure the reliability and integrity of the steam injection system. Furthermore, steam conformance control in the steam injection and cyclic steam stimulation wellbores is crucial for formation heat management in heavy oil fields.

Thus, there continues to be a need for improved flow control devices, mixers, and sealing assemblies of packers for use in steam injection for hydrocarbon recovery.

SUMMARY

Provided herein is one embodiment of a sealing assembly for a packer located within an annulus of a wellbore to hydraulically isolate a segment of the wellbore, the sealing assembly for the packer comprising: a substantially tubular housing comprising a primary sealing element containing a groove; and at least one secondary sealing element disposed within the groove of the primary sealing element; wherein the primary sealing element and the at least one secondary sealing element expand to hydraulically isolate the segment of the wellbore when the packer is actuated, and wherein the expansion of the secondary sealing element is constrained by the groove in the primary sealing element.

Provided herein is one embodiment of a wellbore assembly for delivery of steam into a formation, the wellbore assembly comprising: (a) a flow control device for bifurcating a mixture of steam for delivery into a formation, the flow control device comprising: a body having a tubular outer surface; a recess formed in the tubular outer surface, the recess having an opening for receiving a nozzle, wherein the recess is sufficient in size to accommodate a tool for coupling or removing the nozzle; the nozzle coupled to the opening such that the outermost surface of the nozzle is disposed within an outermost diameter of the tubular outer surface of the body; and a channel within the body that is in fluid communication with the opening in the recess, wherein at least a portion of the mixture of steam received by the channel is delivered to the formation through the nozzle; and (b) a packer containing a sealing assembly to hydraulically isolate a segment of the wellbore, the sealing assembly for the packer comprising: a substantially tubular housing comprising a primary sealing element containing a groove; and at least one secondary sealing element disposed within the groove of the primary sealing element; wherein the primary sealing element and the at least one secondary sealing element expand to hydraulically isolate the segment of the wellbore when the packer is actuated, and wherein the expansion of the secondary sealing element is constrained by the groove in the primary sealing element.

DESCRIPTION OF THE DRAWINGS

FIG. 24 illustrates another embodiment of a static mixer with internal crisscross threading for use in steam injection.

FIG. 25 illustrates a cross-sectional view of one embodiment of a sealing assembly for a packer with a primary sealing element having a groove that has a square cross-sectional shape and a secondary sealing element has a circular cross-sectional shape.

FIG. 26 illustrates a cross-sectional view of another embodiment of a sealing assembly for a packer with a primary sealing element having a groove that has a square cross-sectional shape and the secondary sealing element has a square cross-sectional shape.

FIG. 27 illustrates a cross-sectional view of another embodiment of a sealing assembly for a packer with a primary sealing element having a groove that has a rectangular cross-sectional shape and the secondary sealing element has at least one secondary sealing element and at least one spacer.

FIGS. 28A and 28B illustrate a cross-sectional view of another embodiment of a sealing assembly for a packer with a primary sealing element having a groove that has a rectangular cross-sectional shape and the secondary sealing element has a seal stack or Chevron seal.

FIG. 29 illustrates a cross-sectional view of another embodiment of a sealing assembly for a packer with a primary sealing element having a groove that has a trapezoidal cross-sectional shape and the secondary sealing element has a trapezoidal cross-sectional shape.

FIG. 30 illustrates a cross-sectional view of another embodiment of a sealing assembly for a packer with a primary sealing element having a groove that has a semi-circular cross-sectional shape and the secondary sealing element has a semi-circular cross-sectional shape

DETAILED DESCRIPTION

Terminology

Figure 1A:
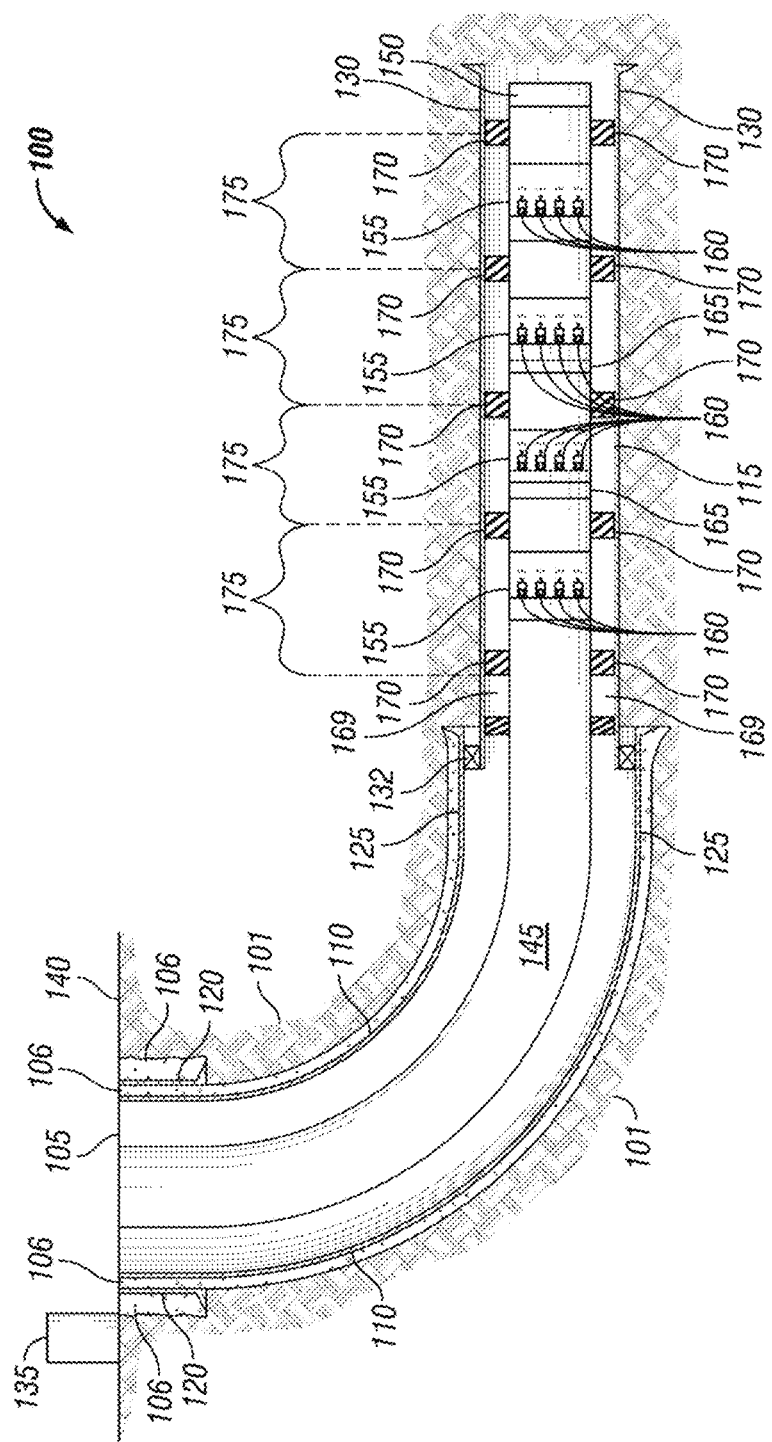
FIG. 1A illustrates one embodiment of a steam injection system.

The following terms will be used throughout the specification and will have the following meanings unless otherwise indicated.

"Sealing assembly" refers to any sealing arrangement within a packer that includes a plurality of sealing elements to hydraulically isolate a segment of the wellbore.

"Steam" refers to a two-phase mixture of water in liquid and vapor (gas) phases. The term steam is not limited to only two-phase mixtures and includes (a) single phase water vapor, (b) single phase liquid, and (c) vapor with additional solvents, chemicals, additives, compounds, or any combination thereof.

"Conformance" refers to the degree of the spatial and temporal uniformity of a steam injection profile along the formation length, for example, the degree of uniformity of steam injection or heat distribution into the formation.

"Formation" refers to the heavy oil bearing reservoir rock matrix in which an injection wellbore is present. For example, a formation refers to a body of heavy oil bearing reservoir rock that is sufficiently distinctive and continuous such that it can be mapped. It should be appreciated that while the term "formation" generally refers to geologic formations of interest, that the term "formation," as used herein, may, in some instances, include any reservoirs, geologic points or volumes of interest (such as a survey area). The term formation is not limited to any structure and configuration described herein. The term formation may be used synonymously with the term reservoir.

"Wellbore" refers to a single hole drilled into the formation for use in hydrocarbon recovery. The wellbore can be used for injection, production, or both. The wellbore may include casing, liner, tubing, conductors, or any combination thereof. Casing and conductor are typically cemented into the wellbore with the cement placed in the annulus between the formation and the outside of the conductor or casing. Tubing and liners are typically not cemented in the wellbore. The wellbore may include an openhole portion or uncased portion. The wellbore is surrounded by the formation. The wellbore may be vertical, inclined, horizontal, or combination trajectories. The wellbore may include any completion hardware that is not discussed separately. The term wellbore is not limited to any structure and configuration described herein. The term wellbore may be used synonymously with the terms borehole or well.

"Casing" and "Conductor" as used herein refers to steel pipe cemented in place during the wellbore construction process to stabilize the wellbore. The casing and conductor form a major structural component of the wellbore and serve several important functions: preventing the formation wall from caving into the wellbore, isolating the different formations to prevent the flow or crossflow of formation fluid, and providing a means of maintaining control of formation fluids and pressure as the wellbore is drilled. The casing can include one or more casing strings, such as a surface casing string and a production casing string within the surface casing string. Casings for heavy oil may have many perforations to allow production fluids to enter from the formation into the wellbore or to allow exit of injected steam from the wellbore to the formation. Casings provide perforations for production or injection while excluding sand production from the wellbore. The term casing is not limited to any structure and configuration described herein.

"Liner" as used herein refers to any string of casing in which the top does not extend to the surface but instead is suspended from inside the previous casing string. Many conventional wellbore designs include a production liner set across the formation interval. Liners for heavy oil may have many apertures to allow production fluids to enter from the formation into the wellbore or to allow exit of injected steam from the wellbore to the formation. Liners provide apertures for production or injection while excluding sand production from the wellbore. In short, a liner refers to any mechanical device suitable for being lowered into a wellbore and may contain one of the following: (a) slots with a controlled aperture dimension cut in pipe, (b) screens with a controlled aperture dimension mounted between perforated based pipe and an outer protective shroud, (c) wire wrapped screens comprised of wire and ribs welded on perforated base pipe with a controlled aperture dimension, or (d) stainless steel wool media mounted between a perforated base pipe and an outer protective outer shroud. The liner creates an annular ring that is between the tubing and formation, or within the wellbore between the tubing and formation for injecting steam to the formation. The term liner is not limited to any structure and configuration described herein.

"Tubing" as used herein refers to any structure suitable for being lowered into a casing or a liner, for the purpose of producing fluids from the formation and/or distributing injected fluids into the formation. For the purpose of steam injection, tubing is made up of a plurality of tubulars (e.g., tubing, tubing joints, pup joints, packers, flow control devices, etc.) connected together. The term tubing is not limited to any structure and configuration described herein. The term tubing may be used synonymously with the term tubing string.

"Flow control device (FCD)" as used herein is a device that can bifurcate a flow of steam and has four basic components: 1) connection at one end (e.g., female threaded connection), 2) connection at the other end (e.g., male threaded connection), 3) an internal path to allow steam to flow through the flow control device, and 4) one or more exit paths equipped with chokes, nozzles, holes, or ports to control the flow (e.g., of steam) from the inside of the flow control device to the outside. The flow control device may be practically any device that can bifurcate a flow of steam. The term flow control device is not limited to the structure and configuration described herein.

"Temperature Observation Well (TOW)" refers to wellbores drilled to allow monitoring of temperatures, pressures, and fluid distribution, including steam at certain points in the formation. The term TOW is not limited to the structure and configuration described herein.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

It is noted that, as used in this specification and the appended claims, the singular forms "a," "an," and "the" include plural references unless expressly and unequivocally limited to one referent. As used herein, the term "include" and its grammatical variants are intended to be non-limiting, such that recitation of items in a list is not to the exclusion of other like items that can be substituted or added to the listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this invention belongs.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if a composition is described herein as including a component of type A, a component of type B, a component of type C, or any combination thereof, it is understood that this phrase describes all of the various individual and collective combinations and permutations of these components. For example, in some embodiments, the composition described by this phrase could include only a component of type A. In some embodiments, the composition described by this phrase could include only a component of type B. In some embodiments, the composition described by this phrase could include only a component of type C. In some embodiments, the composition described by this phrase could include a component of type A and a component of type B. In some embodiments, the composition described by this phrase could include a component of type A and a component of type C. In some embodiments, the composition described by this phrase could include a component of type B and a component of type C. In some embodiments, the composition described by this phrase could include a component of type A, a component of type B, and a component of type C. In some embodiments, the composition described by this phrase could include two or more components of type A (e.g., A1 and A2). In some embodiments, the composition described by this phrase could include two or more components of type B (e.g., B1 and B2). In some embodiments, the composition described by this phrase could include two or more components of type C (e.g., C1 and C2). In some embodiments, the composition described by this phrase could include two or more of a first component (e.g., two or more components of type A (A1 and A2)), optionally one or more of a second component (e.g., optionally one or more components of type B), and optionally one or more of a second component (e.g., optionally one or more components of type C). In some embodiments, the composition described by this phrase could include two or more of a first component (e.g., two or more components of type B (B1 and B2)), optionally one or more of a second component (e.g., optionally one or more components of type A), and optionally one or more of a second component (e.g., optionally one or more components of type C). In some embodiments, the composition described by this phrase could include two or more of a first component (e.g., two or more components of type C (C1 and C2)), optionally one or more of a second component (e.g., optionally one or more components of type A), and optionally one or more of a second component (e.g., optionally one or more components of type B).

Unless defined otherwise, all technical and scientific terms used herein have the same meanings as commonly understood by one of skill in the art to which the disclosed invention belongs.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

Low Profile Flow Control Device:

Provided herein are embodiments of a flow control device (sometimes referred to as a steam distribution device) that is of a low-profile (flush) type to minimize friction and drag forces (hereinafter "low profile FCD"). For example, at least one low profile FCD may be coupled in a tubing, and the low profile FCD has an outermost diameter that is about less than, about equal to, or slightly above the outermost diameter of the tubing.

Advantageously, the low profile FCD provided herein, that is generally flush with a tubing when the low profile FCD is connected to the tubing, is less likely to be stuck in the wellbore. Moreover, it is of a low-profile (flush) type to minimize friction and drag forces when inserting or pulling the tubing in a wellbore. Any nozzle or plug of the low profile FCD will also be within the confines of the low profile FCD and not protrude above the confines of the low profile FCD, which further minimizes friction and drag forces when inserting or pulling the tubing in a wellbore. The reduced forces would also help reduce the likelihood of the tubing and completion hardware being stuck, for example, in the horizontal section of the wellbore. In some embodiments, comparison of baseline torque and drag measurements that are taken at installation and torque and drag measurements taken at a later date (e.g., up to 6 months during a workover) indicate no significant increase in either measurement. The torque and drag measurements are a positive indicator that low profile FCDs are not getting stuck or hung up in the wellbore. During a steam injection operation, the tubing with low profile FCDs can be removed one to five times and reinstalled, for example, to change nozzle sizes or to install surveillance equipment.

Advantageously, for fishing operations, the increased diametrical clearance resulting from the low profile FCD in the tubing improves the probability of recovery (e.g., recovery of practically any equipment downhole such as pipes, drillstems, casing, tubing, packers, other debris, etc.).

Advantageously, the capability of the slot(s) of the low profile FCD to accommodate tools changing nozzles or orifices provides more options for steam injection and can reduce the time it takes for a workover. For example, combinations of nozzles of different diameters can be used to allow steam injection flow rates to be controlled and customized for each low profile FCD. Furthermore, nozzles or plugs can be replaced quickly during a workover and the corresponding low profile FCD can be reinstalled.

Advantageously, the low profile FCD appears to have high efficiency (e.g., greater than or equal to 100% efficiency) in both compression and tension. In other words, the low profile FCD (e.g., between a first tubing joint and a second tubing joint) is at least as strong as the body of the tubing in compression and tension. This high strength is advantageous for the high loads and fishing operations that are encountered in horizontal sections of wellbores. The low profile FCD has been engineered to match the strength of the body of the tubing such that it also has about 100% efficiency in compression, tension, and torsion. The efficiency in tension and torsion has been confirmed in load tests. For a 3½, 9.3 pound per foot, L-80 tubing, the tensile strength is 207,000 pounds and the low profile FCD with a concentric channel was pull tested to this load. For a 2⅞, 6.5 pound per foot, L-80 tubing, the tensile strength is 145,000 pounds and the low profile FCD with an eccentric channel was pull tested to this load. Additionally, the FCDs are inspected by X-ray to ensure full weld penetration and no porosity or voids were present. These results are presented herein as examples.

Advantageously, the low profile FCD provided herein reduces non-uniform phase splitting along the horizontal section of the wellbore, thus delivering a uniform steam quality and ensuring control of latent heat to the formation. For example, the internal flow path angles of the steam in the channel have been designed to provide uniform splitting of the liquid and vapor phase exiting the low profile FCD. In some embodiment, the channel can deliver steam from an inlet of the channel to an outlet of the channel for a steam quality difference between the inlet and the outlet ranging from −15 to +15 steam quality units, where the injected steam is a two-phase steam having a steam quality of less than 100% and over 40%. Phase splitting is discussed further in U.S. Pat. No. 9,022,119, which is incorporated herein by reference in its entirety.

Advantageously, the low profile FCD may be used for conformance and as part of efficiency improvement actions in response to steam injection flow profiling, which is discussed further in U.S. Non-Provisional patent application Ser. No. 15/079,612 filed with the same title and on the same date as the present disclosure, which is incorporated herein by reference in its entirety. U.S. Non-Provisional patent application Ser. No. 15/080,194 filed with the same title and on the same date as the present disclosure is also incorporated herein by reference in its entirety. U.S. Non-Provisional patent application Ser. No. 15/080,199 filed with the same title and on the same date as the present disclosure is also incorporated herein by reference in its entirety.

Those of ordinary skill in the art will appreciate that provided herein is a low profile FCD that is generally flush with a tubing when the low profile FCD is connected to the tubing for distributing steam into a formation. The tubing may be of standard API (American Petroleum Institute) sizes known in the industry (e.g., outermost diameter of 2⅜ inches to 4.5 inches) for standard and commonly known casing size (e.g., outermost diameter of 4½ inches to 12 inches), both of which utilize typical API pipe lengths for range 1, 2 and 3 tubing and casing joint lengths.

The low profile FCD has an outermost diameter that is about less than, about equal to, or slightly above the outermost diameter of the tubing. In some embodiments, the outermost diameter of the low profile FCD device has been reduced to be equal to the outermost diameter of the tubing employed in horizontal injection wellbores, such as being reduced to the outside diameter of semi-flush tubing premium tool joints employed in horizontal injectors. In some embodiments, the outermost diameter of the low profile FCD has been reduced to be less than the outermost diameter of the tubing employed in horizontal or vertical injection wellbores. In some embodiments, the outermost diameter of the low profile FCD is slightly above the outermost diameter of the tubing employed in horizontal injection wellbores. However, if the outermost diameter of the low profile FCD is slightly over, the outermost diameter of the low profile FCD should not be large enough to create a hang-up shoulder when inserting or pulling the tubing in the wellbore. As an example, if the wellbore sands up or the liner is damaged due to thermal stresses, the tubing with the low profile FCD should have a slick profile in order to pull the tubing through the sand or liner damage. In short, the low profile FCD has an outermost diameter that is similar to the outermost diameter of the tubing. The low profile FCD can be connected or coupled to the tubing by welding, screwing, threaded engagement, etc.

The body of the low profile FCD has sufficient metal mass to accommodate a variety of connections including API short thread coupling (STC), long thread coupling (LTC), and buttress (BTC). The low profile FCD will also accommodate low profile premium thermal connections that are 100% efficient in compression and tension for steam injection service. To take full advantage of the low profile FCD design, a low-profile premium tubing connection may be used, such as Tenaris Wedge 533, Tenaris Wedge 563, Tenaris Blue, Vallourec VAM SWI, and Vallourec VAM 21. In some embodiments, the flow control device is coupled to a tubing at a API connection, and the flow control device has an outermost diameter that is at least 0.30 inches less than the outermost diameter of the API connection. For example, the maximum outside diameter of the flow control device may always be at least 0.30 inches less than standard API coupling of the same nominal pipe size in some embodiments. In some embodiments, the flow control device is coupled to a tubing at a premium thermal connection, and the flow control device has an outermost diameter that is not more than 0.05 larger than the outermost diameter of the premium thermal connection. For example, the maximum outside diameter of the flow control device may always be at least 0.30 inches less than standard API coupling of the same nominal pipe size.

The tubing is made up of a plurality of tubulars such as tubing joints and low profile FCDs such as those provided herein, as well as other components (e.g., conventional FCDs, packers such as cup packers, mixers, etc.) utilized with tubing for steam injection. The packers can be conventional packers, such as the EPDM (ethylene-propylene diene monomer) cup packer. Alternatively, the packers may include a sealing assembly with a secondary sealing element discussed further herein. The mixers may be of the static type mixers with internal crisscross threading discussed further herein. The tubing can even include production tubing used for steam injection. The tubing joints can be standard tubing joints that are tens of feet in length (e.g., API range 1, 2, and 3 where range 1 is about 20 feet, range 2 is about 30 feet, range 3 is about 40 feet, etc.). The tubing joints can also include shorter tubing joints, such as pup joints, that are a couple of feet in length (e.g., about 4 feet, about 10 feet, etc.). In some embodiments, a tubing joint may have an outer diameter in the range of 2⅜ inches to about 5½ inches and a pup joint may have an outer diameter in the range of 2⅜ inches to about 5½ inches. A particular tubing joint can have a larger outer diameter at the connection (e.g., an outer diameter of 3.9 inches at one or both ends of the particular tubing joint) when compared to the outer diameter of the body of the particular tubing joint (e.g., an outer diameter of 3.5 inches at the body of the particular tubing joint). The larger outer diameter at one or both ends can be due to threads for connecting to another item, such as with a pin and box (male and female) integral joint connection or a threaded and coupled connection.

As such, the outermost diameter of the tubing can be the largest outermost diameter anywhere along the tubing, for example, the outermost diameter of a tubing joint end in the tubing because the connection between tubing joints may have the largest outermost diameter along a tubing. In some embodiments, the tubing has an outermost diameter in the range of about 2⅜ inches to about 5½ inches. The length of the tubing is based on the particular items connected together to form the tubing. Thus, in some embodiments, the outermost diameter of the low profile FCD is about 2⅜ inches to about 5½ inches and the length of the low profile FCD is about 18 inches to about 48 inches. In some embodiments, the low profile FCD, such as the low profile FCD with a generally concentric channel within the low profile FCD that is provided herein, has an outermost diameter of about 3.9 inches and a length of about 29.15 inches. In some embodiments, the low profile FCD, such as the low profile FCD with a generally eccentric channel within the low profile FCD that is provided herein, has an outermost diameter of about 3.2 inches and a length of about 21.50 inches. In some embodiments, the low profile FCD with the generally eccentric channel has an outermost diameter in a range of about 2 inches to about 3 inches, such as about 2.875 inches.

The low profile FCD can be installed in a variety of ways. In some embodiments, the wellbore is drilled with a vertical section and a horizontal section, then a liner is added to the horizontal section of the wellbore, and then the wellbore is completed using techniques known to those of ordinary skill in the art. The tubing is started at the surface with a bull plug at one end of the tubing. The bull plug will stop the steam from exiting the tubing from this end. At the surface, the second item can be added to the tubing by directly connecting any one of the following items to the bull plug: a FCD such as the low profile FCD provided herein or conventional FCD, a pup joint, a packer such as the packer with flexible material provided herein or a conventional packer, the tubing joint, etc. The tubing can be inserted into the wellbore as it grows in length. At the surface, the third item can be added to the tubing by directly connecting any one of the following items to the second item: a FCD such as the low profile FCD, the pup joint, the packer, the tubing joint, a mixer (e.g., if the second item is an FCD) such as the mixer with crisscross threading provided herein or a conventional mixer, etc. For example, the mixer may be installed directly upstream of the FCD for uniform steam splits from the FCD. The tubing can be inserted into the wellbore as it grows in length, and so on.

Two or more low profile FCDs can be installed in the tubing. The quantity of low profile FCDs installed in the tubing, as well as how deep the tubing is inserted in the wellbore (e.g., proximity to the toe of the horizontal section), can be based on a variety of factors. The factors can be (1) direct measurement of heat arrival in temperature observation wells (TOWs), (2) generated steam injection flow profiles using conventional profiling methodologies or using the fiber optic surveillance system and the profiling methodologies discussed in U.S. Non-Provisional patent application Ser. No. 15/079,612 filed with the same title and on the same date as the present disclosure, which is incorporated herein by reference in its entirety, (3) formation properties, (4) modeling, (5) simulation, (6) steam distribution desired (e.g., steam distribution desired in the horizontal section of the wellbore), (7) steam distribution desired in the vertical section of the wellbore, (8) steam distribution desired in a vertical wellbore, (9) desired steam injection rate, (10) any combination thereof, or (11) other factors.

In some embodiments, a plurality of low profile FCDs, such as two low profile FCDs, can be connected together in series, some other pattern, or as necessary to achieve a desired steam injection rate such as in the event that a single low profile FCD will not provide the desired steam injection rate on its own. Similarly, a plurality of low profile FCDs can be connected together to increase the current steam injection rate to a desired steam injection rate or to achieve a desired rate increase.

Thus, those of ordinary skill in the art will appreciate that various options are available. In some embodiments, a plurality of low profile FCD can be installed in series, some other pattern, or as necessary depending on the embodiment. For example, a first tubing joint can be connected to a first low profile FCD, then a second low profile FCD can be connected to the first low profile FCD, and then a second tubing joint can be coupled to the second low profile FCD. In some embodiments, a plurality of low profile FCDs can be installed. For example, the plurality of low profile FCDs can be installed at designated locations such as at any one of the following: about 30 feet apart, about 60 feet apart, about 90 feet apart, etc. As another example, the plurality of low profile FCDs can be installed in an alternating pattern by installing a first tubing joint, then connecting a first low profile FCD to the first tubing joint, then connecting a second tubing joint to the first low profile FCD, then connecting a second low profile FCD to the second tubing joint, and so on.

Each low profile FCD includes at least one recessed housing for a nozzle or a plug. For example, the recessed housing may be a slot, and each low profile FCD may include at least one slot (e.g., one slot, two slots, three slots, four slots, five slots, six slots, etc.) that is flush with the low profile FCD. Each slot resides within the confines of the low profile FCD. In some embodiments, a single slot includes a single opening to receive a nozzle or a plug. In some embodiments, a single slot includes a plurality of openings to receive a plurality of items, such as two openings to receive two nozzles or receive a nozzle and a plug. A slot has a width of about ¾ inch to 1½ inches, a length of about 4 inches, and a depth of about ¾ inch to about 1½ inches. The nozzle may have a throat (e.g., smallest inner diameter) of about 0.2 inches to about 0.4 inches and a length of about 2 inches to about 3 inches. In some embodiments, the nozzle has a throat of about 0.250 inches, about 0.313 inches, or about 0.375 inches. In some embodiments, the nozzle has a length of about 2.096 inches. The plug may have a diameter of about ½ inch to about 1¼ inches and a length of about 1½ inches to 4 inches. The slot may also include at least one side wall to protect the nozzle or the plug.

The slot has an inverted shape that is wide enough and long enough to allow insertion or removal of the nozzle or the plug. In some embodiments, the slot has a T shape, a V shape, or other shape that is sufficient in size to accommodate a tool for inserting or removing the nozzle or the plug. The tool can be a wrench or another tool capable of engaging the nozzle or the plug. The tool can be used to remove a first nozzle from the slot and insert a different nozzle into the slot, for example, during routine maintenance of the first nozzle, in the event that the first nozzle gets clogged, etc. The tool can also be used to replace the first nozzle in the slot with a plug or a nozzle with a smaller throat size, for example, to reduce the extracted flow from the low profile FCD, etc.

When the nozzle or the plug is inserted into the slot, the nozzle or the plug remains within the confines of the slot and does not protrude above the outermost diameter of the low profile FCD. For example, the nozzle or the plug inserted in the slot is below or equal to the outermost diameter of the low profile FCD. In other words, the nozzle or the plug is within or at a maximum flush with the slot, and the slot is flush with the outside diameter of the low profile FCD.

Internally, the low profile FCD includes a channel, for example, a generally concentric channel or a generally eccentric channel. The channel runs from end to end within the low profile FCD. The inner diameter of the generally concentric channel may be in a range of about 1 inch to about 4 inches. In some embodiments, the generally concentric channel has an inner diameter of about 2.96 inches and a reduced inner diameter of about 1.75 inches. The inner diameter of the generally eccentric channel may be in a range of about 1.25 inches to about 2 inches. In some embodiments, the generally eccentric channel has an inner diameter of about 1.75 inches that stretches from one end of the low profile FCD to the other end for the steam to flow through. In some embodiments, the channel is an eccentric channel and the channel has an inner diameter of at least 1.75 inches. In some embodiments, the channel is a concentric channel and the channel has an inner diameter of at least 1.75 inches. The minimum flow control device inner diameter of 1.75 inches for the concentric channel and 1.75 inches for the eccentric channel may assist with pipe recovery operations because it allows access through the flow control device to cut pipe below it if required.

Each low profile FCD may be formed of stainless steel such as SAE 304 stainless steel, API L-80, API L-80 IRP, API K-55, or API T-95. The nozzle may also be formed of stainless steel such as SAE 304 stainless steel or tungsten carbide. The nozzles may also use steels with surface hardening techniques such as carburizing, nitriding, carbonitriding, nitrocarburizing, boriding, and titanium-carbon diffusion. The plug may also be formed of stainless steel such as SAE 304 stainless steel. The tubing joints and pup joints can be formed of stainless steel such as API L-80, API L-80 IRP, API K-55, or API T-95.

Each low profile FCD may be formed by milling, boring, welding, or any combination thereof. For example, the low profile FCD can be formed by welding together a plurality of components, such as welding together two components (e.g., two pipes). In some embodiments though, the low profile FCD is a single component. Furthermore, for example, the slot can be formed by milling the exterior surface of a pipe, the opening in the slot (e.g., with a passageway having an outward angle of about 15 degrees) for receiving the nozzle or the plug can be formed by milling through the pipe, and the channel can be formed by boring through the interior of the pipe. In some embodiments, a part of the channel (e.g., the generally concentric channel or the generally eccentric channel) can be bored into a first component, a part of the slot can be milled into the first component, and the opening in the slot (e.g., with a passageway having an outward angle of about 15 degrees) for receiving the nozzle or the plug can be milled into the first component. In some embodiments, the angle of the extraction ports that takes steam from the inside of the tubing to nozzle(s), for example, is between about 10 degrees to about 20 degrees relative to the flow control device long axis. Milling the opening in the first component can include milling a first passageway with an outward angle of about 15 degrees and then milling a second passageway to intersect the first passageway, or vice versa. The other part of the channel can be bored into a second component and the other part of the slot can be milled into the second component. The first component and the second component can be welded together to align the two parts of the slot and the two parts of the channel. For the low profile FCD with the generally concentric channel within the low profile FCD, additional rods can be welded between the slots to increase the strength of the low profile FCD. In some embodiments, the low profile FCD can include four slots and a generally concentric channel within the low profile FCD. The four slots are 90 degrees apart around the circumference of the low profile FCD. Each of the four slots can receive a nozzle or a plug. In some embodiments, the concentric channel has an inner diameter of about 2.96 inches and a reduced inner diameter of about 1.75 inches. The inwardly and outwardly tapered surfaces corresponding to the reduced diameter are at about 15 degrees respective inclines or declines. The opening in each slot for receiving the nozzle or the plug can have a passageway with an outward angle of about a 15 degree to the flow of fluid. Alternatively, the optimum angle for the opening can be the smallest angle allowed by machining tools.

In some embodiments, the low profile FCD can include a single slot for receiving a plurality of items (e.g., two nozzles) and a generally eccentric channel within the low profile FCD. For example, the single slot can receive two nozzles of various throat sizes, or alternatively, the single slot can receive one nozzle and one plug. In some embodiments, the eccentric channel has an inner diameter of about 1.75 inches from one end of the low profile FCD to the other end for the steam, an inner diameter of about 2.468 inches for the lip, a smaller outer diameter of about 3.125 inches for the threaded end, and an outermost diameter of about 3.20 inches for the low profile FCD. The opening in each slot for receiving the nozzle or the plug can have a passageway with about a 15 degree outward angle to the flow of fluid. Alternatively, the optimum angle for the opening can be the smallest angle allowed by machining tools.

FIG. 1 illustrates one embodiment of a steam injection system consistent with the inventive aspects. The steam injection system 100 includes a wellbore 105 drilled into a formation 101 with a vertical section 110 and a horizontal section 115. The wellbore 105 is also cemented as illustrated by cement 106. The area between the vertical section 110 and the horizontal section 115 is generally referred to as the heel and the area towards the end of the horizontal section 115 is generally referred to as the toe. The toe is typically the deepest measured depth of the wellbore. The heel is typically at the start of the horizontal segment of the wellbore. The system 100 includes a surface casing 120 along a portion of the wellbore 105, a production casing 125 along a portion of the wellbore 105, and a liner 130 (e.g., a slotted liner) attached by at least one liner hanger 132. The system 100 includes at least one steam injector 135 at a surface 140. The system 100 also includes a tubing 145 within the surface casing 120, the production casing 125, and the liner 130, which starts at the surface 140. The tubing 145 may be of standard sizes known in the industry (e.g., outermost diameter of 2⅜ inches to 4.5 inches) for standard and commonly known casing sizes (e.g., outermost diameter of 4½ inches to 12 inches), each of which have lengths in the tens to hundreds of feet. The end of the tubing 145 (e.g., at the toe) includes a bull plug 150.

The tubing 145 includes a plurality of tubulars such as flow control devices, tubing joints, pup joints, packers (e.g., may include centralizers), mixers, etc. For example, the tubing 145 may include at least one flow control device, such as a conventional FCD or a low profile FCD 155. Each low profile FCD 155 may include at least one nozzle 160 or plug (plugs are discussed further in connection with FIG. 7). As illustrated, a set of four nozzles 160 may be in a single low profile FCD 155. Alternatively, multiple sets of four nozzles 160 may be in a single low profile FCD 155 (e.g., eight nozzles in a single low profile FCD 155). Also, the nozzles 160 may be around the circumference of the low profile FCD 155 instead of the parallel arrangement illustrated in FIG. 1. Those of ordinary skill in the art will appreciate that other embodiments of the low profile FCD 155 may include more than or fewer than four nozzles. For example, some other embodiments of the low profile FCD 155 are provided herein.

At least one mixer 165 may be coupled to a flow control device, such as the low profile FCDs 155. For example, the mixer 165 may be a conventional mixer (e.g., a conventional static mixer), the static mixer with internal crisscross threading provided herein, or any combination thereof. For example, the mixer 165 improves the phase split uniformity of wet steam. Steam phase split uniformity is defined as having less than 15 quality units difference between the inlet and outlet qualities. For example, "wet steam" may have a less than 95% steam quality (i.e., of about 5% or greater of mass fraction of liquid). "Steam quality" refers to the mass fraction of vapor.

A plurality of packers 170 may be located in an annulus 169 between the tubing 145 and the liner 130 (or casing 125 when there is no liner). The packers 170 may be conventional packers or conventional cup packers, the packers with flexible material as provided herein, or any combination thereof. The plurality of packers 170 may create a plurality of wellbore segments 175, and each wellbore segment 175 includes each flow control device, mixer, and other items within that wellbore segment 175.

In operation, a volume of steam from the steam injector 135 may enter the tubing 145 at the surface 105 and the steam is injected into the adjacent formation 101 according to the characteristics of each steam wellbore segment 175. For example, starting from the heel, a portion of the volume of steam may enter the first low profile FCD 155 and that portion of the volume of steam exits the respective nozzles 160 of the first low profile FCD 155 to flow through perforations in the liner 130 to the adjacent formation 101 per the characteristics of that first steam wellbore segment 175. Similarly, a portion of the volume of steam flows through the mixer 165 that is coupled to the second low profile FCD 155, exits the mixer 165, enters the second low profile FCD 155, exits the respective nozzles 160 of the second low profile FCD 155, and flows through perforations in the liner 130 to the adjacent formation 101 per the characteristics of that second steam wellbore segment 175, and so on.

Of note, FIG. 1 is not drawn to scale and various modifications may be available, for example, the wellbore 105 may be a vertical wellbore, the wellbore 105 may have a different components or quantity of components than those illustrated in FIG. 1, or the liner or casing may include conventional FCDs as those from Weatherford, Schlumberger, Absolute, and Halliburton to name a few. For example, the steam injection system 100 may include a capillary tubing to house at least one optical fiber as discussed further in U.S. Non-Provisional patent application Ser. No. 15/079,612 filed with the same title and on the same date as the present disclosure, which is incorporated herein by reference in its entirety.

The capillary tubing may be part of a fiber optic surveillance system. There are many methods to install fiber optic surveillance systems into wellbores for surveillance purposes. The first design choice is to select a permanent, pumpable, or a temporary deployable fiber optic surveillance system. A pumpable system allows the optical fibers to be recovered and replaced should they experience hydrogen darkening. A pumpable system typically comprises two capillary tubes to enable the pumping fluid to be pumped down the capillary tube and returned to surface. The viscous drag force of the pumped fluid on the optical fiber enables recovery and replacement of optical fibers. A turnaround sub with a U-tube geometry is used at the deepest wellbore placement of the fiber optic surveillance system to join the two capillary tubes and enable pumping. The pumping of optical fiber can occur in a factory, controlled surface environment, or at the wellsite with optical fibers in the wellbore. Pumpable systems are typically limited to one or two optical fibers.

A permanent optical fiber is typically installed inside a capillary tube in factory or surface control environment. Permanent systems may have many optical fibers installed within the capillary tube and could include multimode optical fibers, single mode optical fibers, fiber Bragg grating arrays, and optical pressure gauges. If a permanent optical fiber becomes damaged due to hydrogen darkening or thermal degradation, the only recourse is generally a complete replacement of the system. The permanent and pumpable system can strap or clamp the fiber optic capillary tube to the outside of casing, liners, and tubing or they can be installed inside a coiled tubing instrument tube.

A temporary deployable fiber optic surveillance system is run into a wellbore off a reeling system into the tubing or into a coiled tubing instrument tube. The coiled tubing instrument tube could be free hanging in the tubing-casing annulus or strapped to the tubing, casing, or liner. In some embodiments, the temporary deployable fiber optic surveillance system has small diameter FIMT (fiber in metal tube) with an outside diameter of 0.09 to 0.15 inches which is reinforced with fiber glass, polyproylene, polyethylene, carbon fiber, and combinations of the foregoing which encases and protects the FIMT. This temporary deployable fiber optic system is designed to be run in and out of many wellbores and is typically installed for a few hours to a few weeks to acquire surveillance data.

Figure 2:
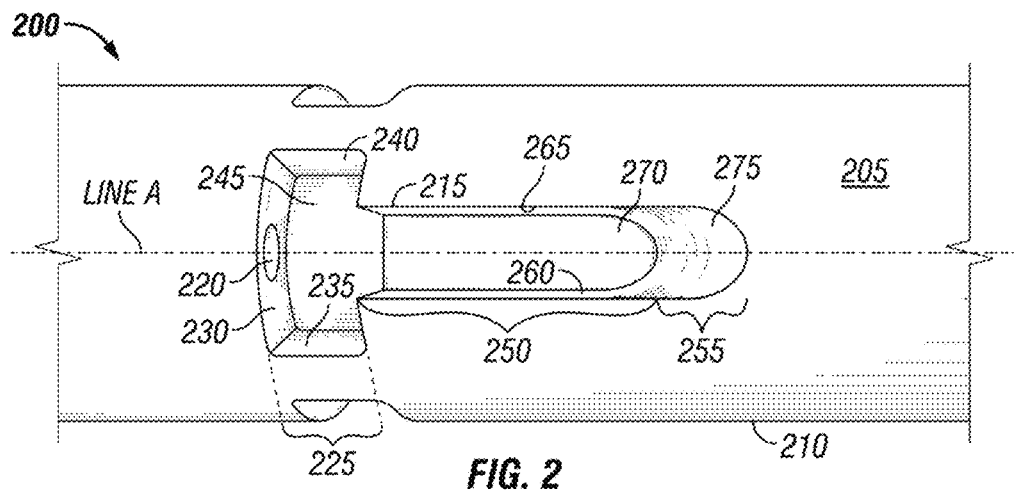
FIG. 2 illustrates one embodiment of a low profile FCD for use in steam injection.

FIG. 2 illustrates one embodiment of a low profile FCD 200 for use in steam injection. The low profile FCD 200 may be used in place of the low profile FCD 155 that is illustrated in FIG. 1. The low profile FCD 200 includes a body 205, an outer surface 210, and an outermost diameter. The outermost diameter of the low profile FCD 200 may be about 4 inches and a length along line A of about 30 inches. For example, the outermost diameter of the low profile FCD 200 may be about 3.9 inches.

Figure 3:
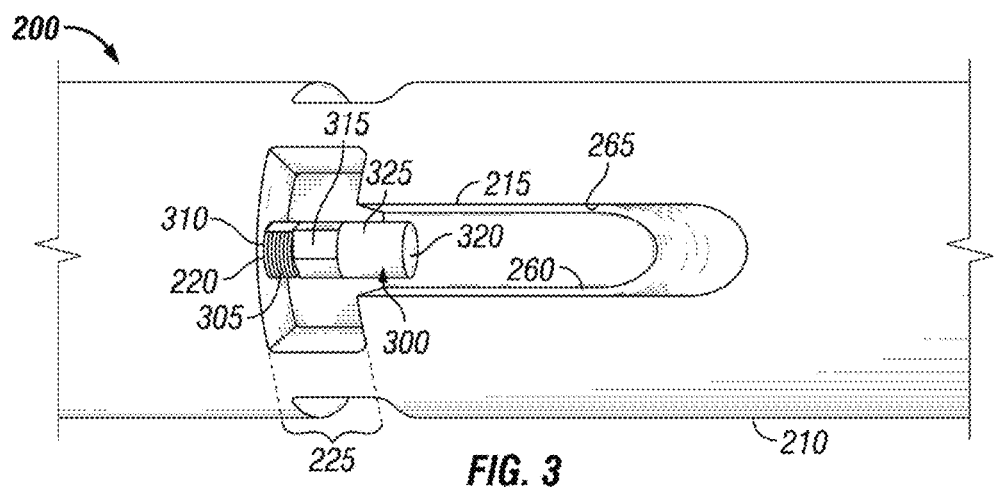
FIG. 3 illustrates the low profile FCD of FIG. 2 with one embodiment of a nozzle.
Figure 4:
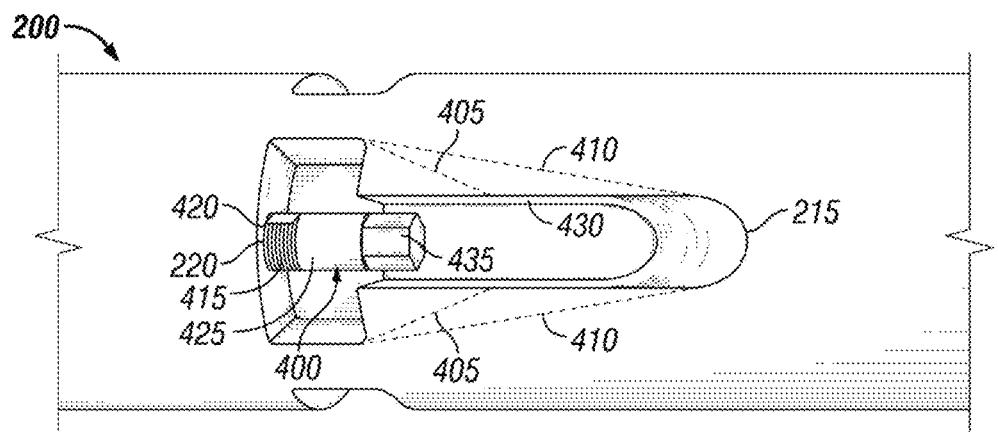
FIG. 4 illustrates the low profile FCD of FIG. 2 with another embodiment of the nozzle.

The low profile FCD 200 includes at least one recess for receiving the nozzle or plug. As illustrated, the recess may be a slot 215 that is formed in the outer surface 210 of the low profile FCD 200. The slot 215 has a shape and an opening 220 for receiving the nozzle or the plug. The nozzle may be the nozzle 160 in FIG. 1, the nozzle 300 in FIG. 3, the nozzle 400 in FIG. 4, or other nozzle. The plug may be the plug 700 in FIG. 700 or other plug. The diameter of the opening 220 is about ⅝ inch and the depth is about ⅝ inch. In some embodiments, the dimensions of the opening 220 correspond to the dimensions of the nozzle or the plug. Internally, the opening 220 may include at least one passageway with threads for receiving a threaded end of the nozzle or a threaded end of the plug. As illustrated in FIGS. 2-4, the slot 210 may have an inverted shape, and more particularly, a T shape. However, in some embodiments, the slot 215 may have another shape, such as a V shape as illustrated in FIG. 4 by dash lines 405 or dash lines 410.

Figure 9:
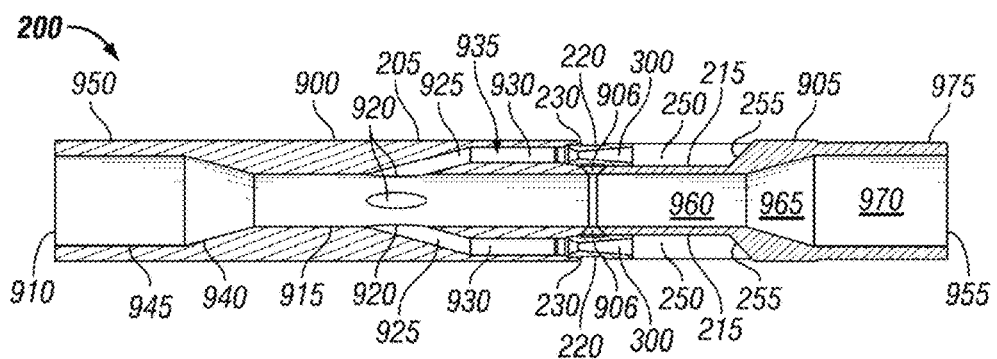
FIG. 9 illustrates a cross-sectional view (lengthwise) of the low profile FCD of FIG. 2 with a plurality of slots.
Figure 10A:
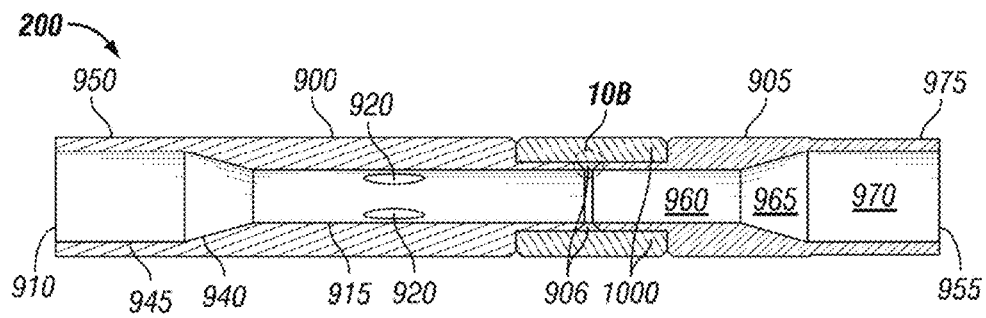
FIGS. 10A and 10B illustrate various views (lengthwise) of the low profile FCD of FIG. 2 with a focus on one embodiment of the first welding step and one embodiment of the second welding step.
Figure 12:
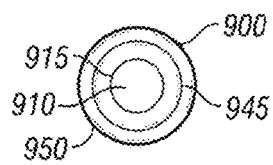
FIG. 12 illustrates a cut-away of one embodiment of a channel at one embodiment of an inlet end of the low profile FCD of FIG. 2.
Figure 13:
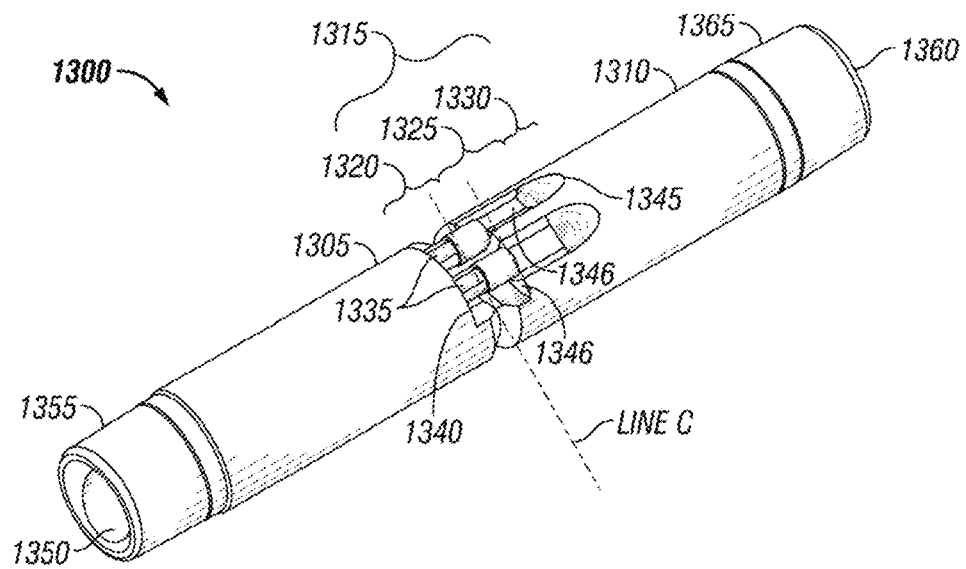
FIG. 13 illustrates another embodiment of a low profile FCD for use in steam injection.
Figure 14:
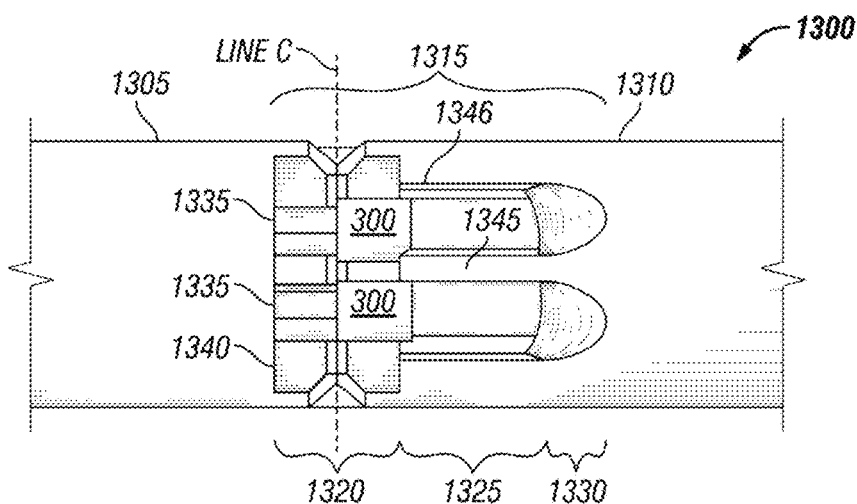
FIG. 14 is a more detailed top view of the low profile FCD of FIG. 13.
Figure 15:
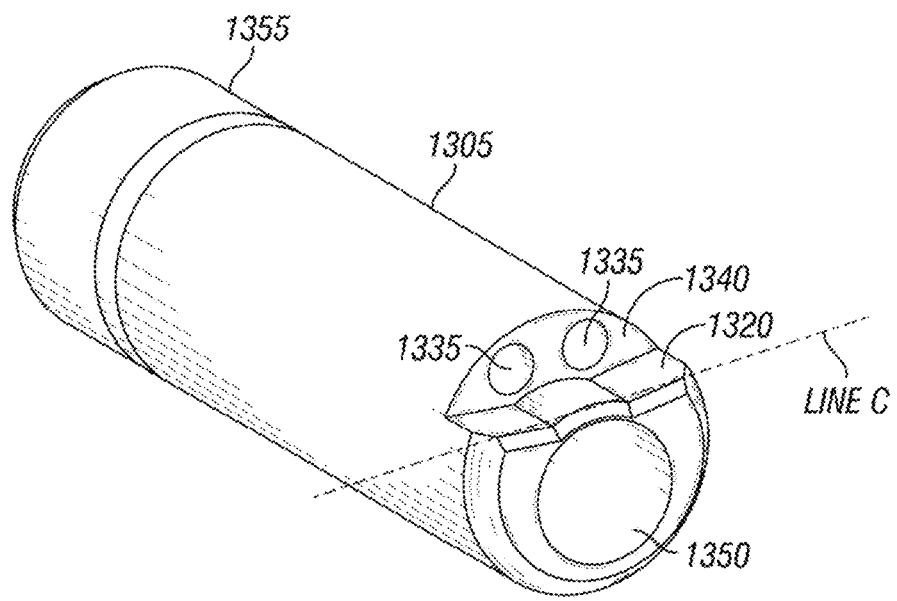
FIG. 15 is a more detailed view of a first low profile FCD component of the low profile FCD of FIG. 13.
Figure 16:
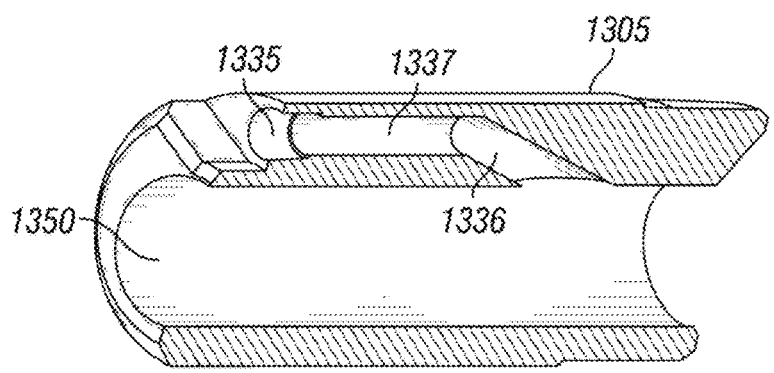
FIG. 16 is a cross-sectional view (lengthwise) of the first low profile FCD component of FIG. 15.
Figure 17:
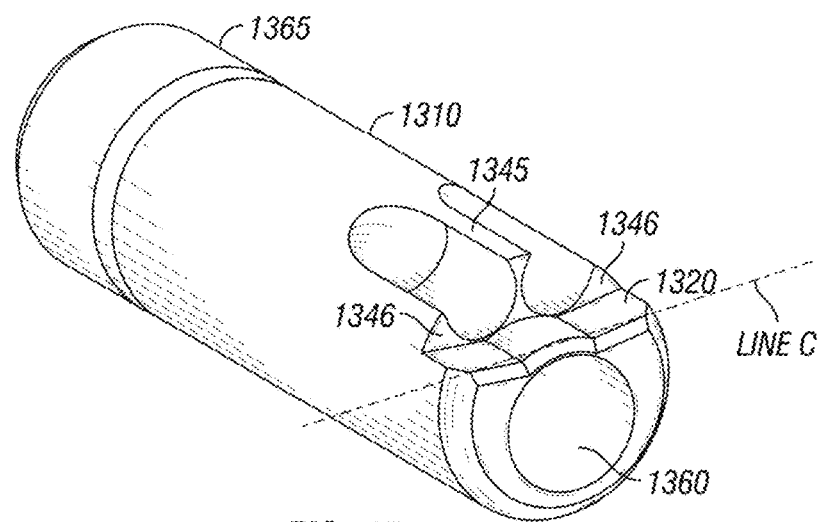
FIG. 17 is a more detailed view of a second low profile FCD component of the low profile FCD of FIG. 13.
Figure 20:
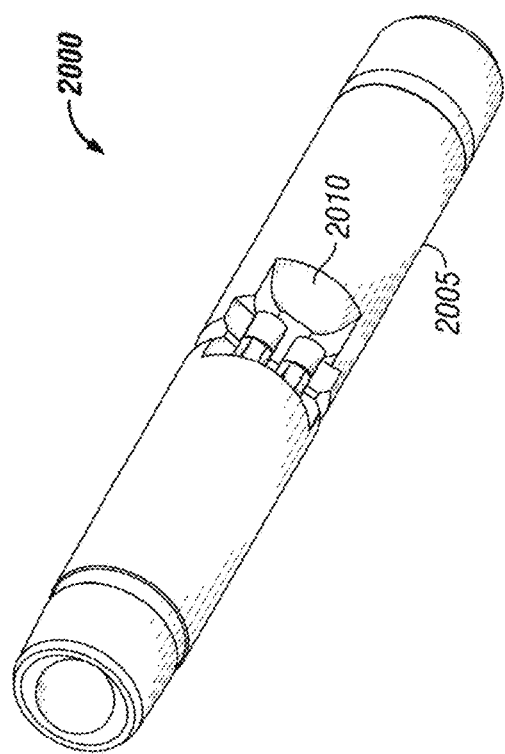
FIG. 20 illustrates another embodiment of a low profile FCD for use in steam injection.

The slot 215 also includes an opening portion 225 with an opening wall 230 for the opening 220. The opening portion 225 is large enough to accommodate a tool, such as a wrench, so that a user can screw or unscrew the nozzle into the opening 220. Similarly, the opening portion 225 is large enough to accommodate the tool so that the user can screw or unscrew the plug into the opening 220. The opening portion 225 can also include at least one side wall adjacent to the opening wall 230, such as side walls 235, 240. In some embodiments, the opening portion 225 does not include side walls, as illustrated in FIG. 13 and FIG. 20. The opening portion 225 also includes a floor 245 adjacent to the opening wall 230 and between the side walls 235, 240. The floor 245 can be curved, flat, a combination of curved and flat, or other design. For example, the floor 245 can reflect the shape of the channel inside the low profile FCD 200, such as reflect a generally concentric channel or a generally eccentric channel inside the low profile FCD 200. One embodiment of a concentric channel is illustrated in FIGS. 9, 10A, and 12.

One embodiment of an eccentric channel is illustrated in FIGS. 16, 18B, and 19, 20. The opening portion 225 has a generally rectangular shape with a length along line A of about 1 inch, a width between side walls 235, 240 of about 2¼ inches, and a depth of about ¾ inch.

The slot 215 also includes a steam pathway portion 250 that directs the steam exiting the nozzle towards a steam deflection portion 255. The steam pathway portion 250 is adjacent to the opening portion 225. The steam pathway portion 250 can also include at least one side wall, such as side walls 260, 265. The steam pathway portion 250 also includes a floor 270 between the side walls 260, 265. The floor 270 can be curved, flat, a combination of curved and flat, or other design. For example, the floor 270 can reflect the shape of the channel inside the low profile FCD 200, such as reflect a generally concentric channel or a generally eccentric channel inside the low profile FCD 200. The floor 270 of the steam pathway portion 250 can be level with the floor 245 of the opening portion 225. However, in some embodiments, the floor 270 is at a first elevation and the floor 245 is at second elevation that is different from the first elevation. The steam pathway portion 250 has a length along line A of about 5 inches, a width between side walls 260, 265 of about 1½ inches, and a depth of ¾ inch.

The steam deflection portion 255 is adjacent to the steam pathway portion 250 and directs the steam towards the perforations in the liner 130 and to the formation 101 in FIG. 1. The steam deflection portion 255 includes a deflection wall 275 with a generally U shaped appearance and a slope of about 45°. The deflection wall 275 may have an angle of less than about 90 degrees. In some embodiments, the deflection wall 275 may have an angle of about 30 degrees to about 60 degrees. In some embodiments, the deflection wall 275 may have an angle of about 45 degrees. The U shape and/or the slope can reduce erosion by the steam of the slot 215, the low profile FCD 200, etc. In some embodiments, the steam deflection wall 275 can have a generally square shaped appearance, a generally rectangular shaped appearance, or other shape. Also, in some embodiments, the deflection wall 275 of the steam deflection portion 255 and the side walls 260, 265 of the steam pathway portion 250 can be a single continuous wall. Although not shown, a tubing joint, a pup joint, a flow control device (e.g., another low profile FCD 200), or other item may be coupled to each end of the low profile FCD 200.

FIG. 3 illustrates the low profile FCD 200 of FIG. 2 with one embodiment of a nozzle 300. Externally, the nozzle 300 includes a threaded portion 305 for engaging with the opening 220. The threaded portion 305 includes a nozzle inlet 310 for steam from the interior of the low profile FCD 200 to enter the nozzle 300. The nozzle 300 also includes a wrench flat portion 315 adjacent to the threaded portion 305 that facilitates turning of the nozzle 300 with a wrench or other tool. The nozzle 300 also includes a nozzle outlet 320 in a diffuser portion 325, and the diffuser portion 325 is adjacent to the wrench flat portion 315. The steam exits the nozzle 300 via the nozzle outlet 320. Internally, the nozzle 300 can include reduced cross-section or a venturi design. The nozzle 300 may have a throat (e.g., smallest inner diameter) of about 0.15 inches to about 0.4 inches and a length of about 2 inches to about 3 inches. In some embodiments, the nozzle 300 has a throat of about 0.250 inches, about 0.313 inches, or about 0.375 inches. In some embodiments, the nozzle 300 has a length of about 2.096 inches. In some embodiments, the low profile FCD 200 can accommodate high efficiency venturi chokes, straight bore chokes, or drilled holes for steam injection.

FIG. 4 illustrates the low profile FCD 200 of FIG. 2 with another embodiment of the nozzle. Externally, the nozzle 400 of FIG. 4 includes a threaded portion 415 for engaging with the opening 220. The threaded portion 415 includes a nozzle inlet 420 for steam from the interior of the low profile FCD 200 to enter the nozzle 400. The nozzle 400 also includes a diffuser portion 425 adjacent to the threaded portion 415. The nozzle 400 also includes a nozzle outlet 430 in a wrench flat portion 435. The wrench flat portion 435 is adjacent to the diffuser portion 425 and the wrench flat portion 435 facilitates turning of the nozzle 400 with a wrench or other tool. As illustrated in FIG. 4, the slot 215 may have a V shape as illustrated with dash lines 405 or dash lines 410. For example, it may be easier to engage the diffuser portion 425 of the nozzle 400 that is in the center part of the nozzle 400 when the slot 215 has more of a V shape.

Nonetheless, the steam exits the nozzle 400 via the nozzle outlet 430. Internally, the nozzle 400 can include a reduced cross-section or a venturi design. The nozzle 400 may have a throat (e.g., smallest inner diameter) of about 0.20 inches. In some embodiments, the nozzle 400 has a throat of about 0.31 inches. In some embodiments, the nozzle 400 has a length of about 2 inches. In some embodiments, the low profile FCD 200 can accommodate high efficiency venturi chokes, straight bore chokes, or drilled holes for steam injection.

Figure 5:
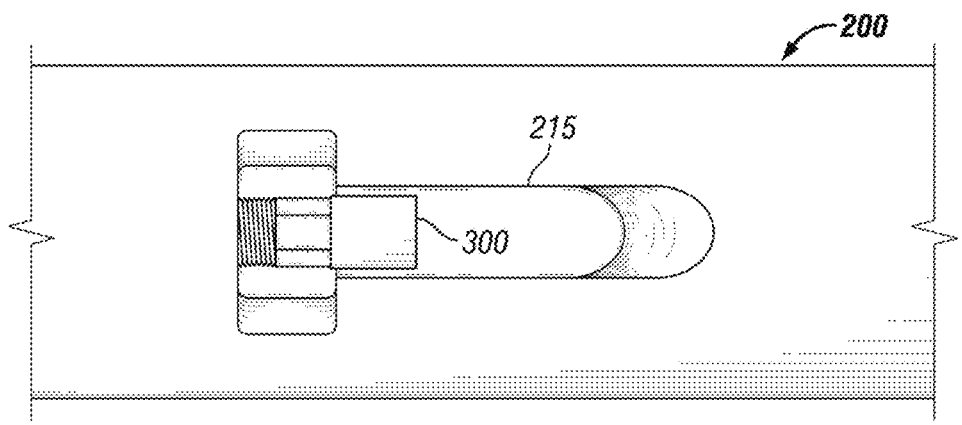
FIG. 5 illustrates a top view of the low profile FCD of FIG. 2.
Figure 6:
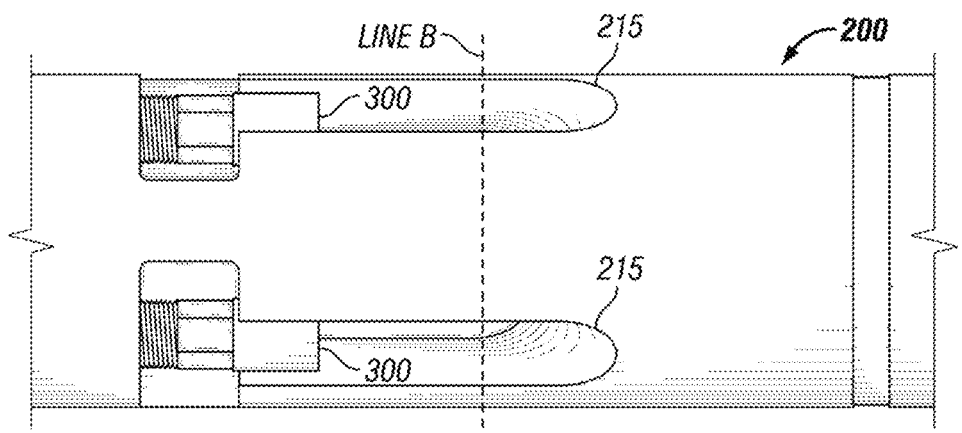
FIGS. 6-7 illustrate the low profile FCD of FIG. 2 with a plurality of slots.
Figure 7:
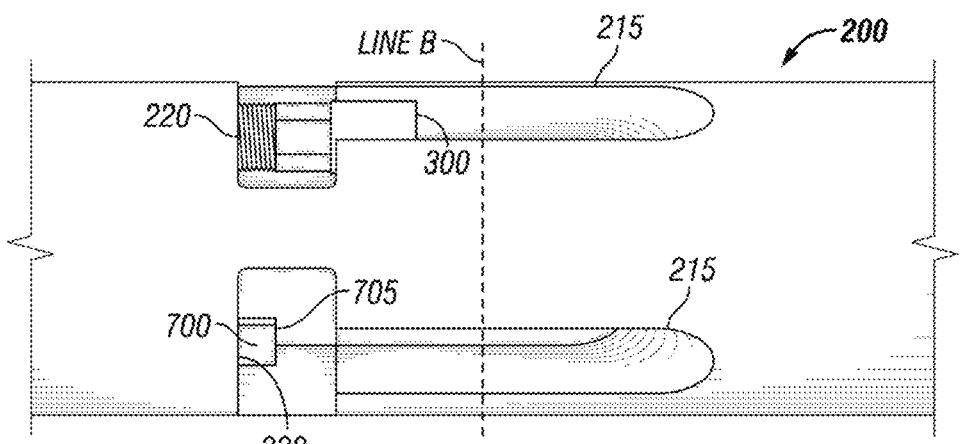
Figure 8:
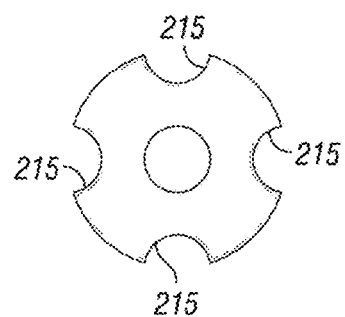
FIG. 8 illustrates a cut-away of the low profile FCD of FIG. 2 along line B of FIGS. 6-7.

FIG. 5 illustrates a top view of the low profile FCD 200 with a single slot. FIGS. 6-7 illustrate the low profile FCD 200 of FIG. 2 with a plurality of slots 215. FIG. 8 illustrates a cut-away of the low profile FCD 200 of FIG. 2 with the plurality of slots of FIGS. 6-7. For example, the low profile FCD 200 may include four slots 215 around the circumference of the low profile FCD 200 about 90 degrees apart. FIGS. 6-7 are not necessarily to scale, but illustrate two of the four slots 215. FIG. 8 is not necessarily to scale, but FIG. 8 illustrates a cut-away of the four slots 215 at about line B of FIGS. 6-7.

Each of the slots 215 in FIGS. 5-8 may receive a nozzle, such as the nozzle 300 (as illustrated in FIGS. 3 and 5-7), the nozzle 400 as illustrated in FIG. 4, or other nozzle. Alternatively, at least one plug 700, instead of a nozzle, can be screwed into a particular opening 220 of a particular slot 215, as illustrated in FIG. 7. The plug 700 has a threaded portion (e.g., similar to the threaded portion 305 of the nozzle 300) and a wrench portion 705 (e.g., similar to the wrench flat portion 315 of the nozzle 300). For example, the plug 700 can be utilized to restrict the extracted flow from the low profile FCD 200. The plug may have a diameter of about ⅝ inch and a length of about ⅝ inch. Thus, each slot 215 can receive a nozzle (e.g., the nozzle 300, the nozzle 400, or other nozzle) or a plug (e.g., the plug 700 or other plug).

In operation, a user can introduce the nozzle or a plug, such as the nozzle 300, into the opening 220. Next, the user can apply a wrench to the wrench flat portion 315 of the nozzle 300 via the opening portion 225 of the slot 215. Next, the user can screw the nozzle 300 into the opening 220 with the wrench. After the nozzle 300 is screwed into the opening 220, a part of the nozzle 300 may be located between the side walls 260, 265 as illustrated in FIGS. 3-4, as the side walls 260, 265 can reduce the chance that the nozzle 300 will get stuck or damaged. Furthermore, after the nozzle 300 is screwed into the opening 220, the nozzle 300 does not protrude above the outermost diameter of the low profile FCD 200. For example, the nozzle 300 is below or equal to the outermost diameter of the low profile FCD 200. In other words, the nozzle 300 is flush with the slot 215 and the slot 215 is flush with the low profile FCD 200, as illustrated in FIGS. 2-8. A similar process can be applied to the nozzle 400, another nozzle, the plug 700, or another plug, and each of these does not protrude above the outermost diameter of the low profile FCD 200.

Figure 10B:
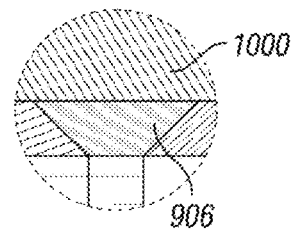
Figure 11:
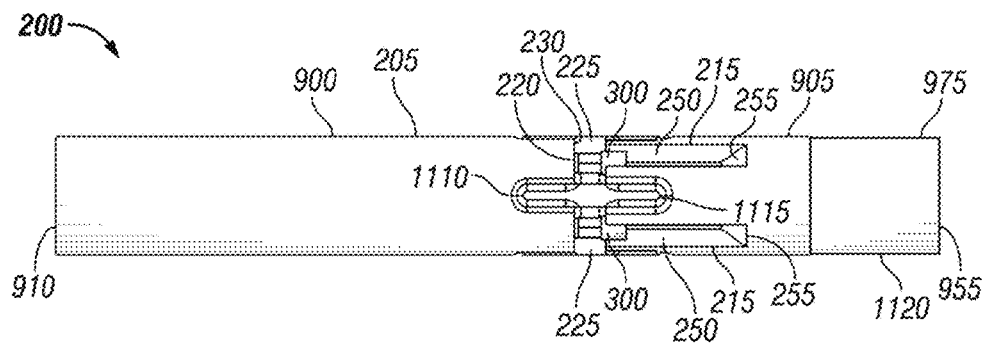
FIG. 11 illustrates another view (lengthwise) of the low profile FCD of FIG. 2 with a focus on the embodiment of the first welding step and the embodiment of the second welding step of FIGS. 10A and 10B.

The low profile FCD 200 can be manufactured by welding a plurality of components together, for example, as illustrated in FIGS. 9, 10A, 10B, and 11. The low profile FCD 200 may be comprised of a first low profile FCD component 900 with the opening wall 230 and the opening 220 of each slot 215, as well as a second low profile FCD portion 905 with the steam pathway portion 250 and the deflection portion 255 of each slot 215. The opening portion 225 that is large enough to accommodate logging tools is split across the first low profile FCD component 900 and the second low profile FCD component 905. In short, the slot 215 is split across the components 900 and 905. The first low profile FCD component 900 and the second low profile FCD component 905 can be welded in two steps. The first step includes making at least one fillit weld or butt weld 906 to internally weld the first low profile FCD component 900 and the second low profile FCD component 905, as illustrated in FIGS. 9, 10A, and 10B. The butt weld 906 is a 360 degree butt weld. The second step includes welding at least one bar 1000 (or a rod or similar item) between the slots 215. For example, as illustrated in FIG. 11, the first low profile FCD component 900 may include a first welding portion 1110 in a U shape between the slots 215, and the second low profile FCD component 905 may include a second welding portion 1115 in a U shape between the slots 215. The bar 1000 may be welded into each first welding portion 1110 and corresponding second welding portion 1115, as illustrated in FIGS. 10A-10B. When the bars 1000 are welded into place, the welding may not be noticeable between the slots 215. The bars 1000 increase tensile strength.

Internally, the first low profile FCD component 900 has a first channel 910 that is generally concentric. The first channel 910 may have a first channel outlet portion 915 with an opening 920 adjacent to a first passageway 925. The first passageway 925 may have an outward angle of about 15 degrees. The first passageway 925 is adjacent to a second passageway 930 that terminates at the opening 220 in the slot 215. The first passageway 925 may have a length of about 4 inches to about 5 inches and an inner diameter of about 3 inches. The second passageway 930 may have a length of about 4 inches to about 5 inches and an inner diameter of about 3 inches. The first passageway 925 may be manufactured by milling at about location 935 and then the second passageway 930 may be manufactured by milling at the opening 220 in the slot 215 until the two passageways intersect. Alternatively, the second passageway 930 may be milled before and then the first passageway 925 may be milled. As illustrated, steam from within the first channel 910 flows through the opening 920, through the first passageway 925, through the second passageway 930, through the opening 220, and through the nozzle 300. The first channel 910 may have this setup for each opening 220.

Continuing with the first low profile FCD component 900, the first channel outlet portion 915 may be adjacent to a first channel tapered portion 940. In some embodiments, at least one opening 920 may be in a different location, for example, at least one opening 920 may be in the first channel tapered portion 940. The first channel tapered portion 940 may have inwardly and outwardly tapered surfaces corresponding to the reduced diameter are at about 15 degrees respective inclines or declines. In some embodiments, the first channel tapered portion 940 may have surfaces that correspondence with different angles, such as about 15 degrees to about 45 degrees. For example, the first channel tapered portion 940 (and portion 965) may include beveled entry guides from ~30 degrees to ~60 degrees relative to the flow control device long axis through the reduced inside diameter, which may allow passage of tools for both logging and pipe recovery through the flow control device. The first channel inlet portion 945 may be adjacent to the first channel tapered portion 940. The steam enters the first channel 910 through the first channel inlet portion 945. The first channel inlet portion 945 may correspond with a low profile FCD inlet end 950.

FIG. 12 illustrates a cut-away at a low profile FCD inlet end 950 of the low profile FCD of FIG. 2. As illustrated, FIG. 12 illustrates the various diameters of the channel 910 at the low profile FCD inlet end 950 of the first low profile FCD component 900. In some embodiments, the first channel outlet portion 915 may have an inner diameter of about 1 inch to about 2 inches throughout its length. In some embodiments, the first channel outlet portion 915 may have an inner diameter of about 1.75 inches throughout its length. The length of the first channel outlet portion 915 may be about 3 inches. In some embodiments, the first channel inlet portion 945 may have an inner diameter of about 2 inches to about 4 inches throughout its length. In some embodiments, the first channel inlet portion 945 may have an inner diameter of about 3 inches to about 4 inches throughout its length. In some embodiments, the first channel inlet portion 945 may have an inner diameter of about 3.90 inches throughout its length. The length of the first channel inlet portion 945 may be about 3 inches. In some embodiments, the first channel tapered portion 940 may have an inner diameter that is higher that the inner diameter of the first channel outlet portion 915 and lower than the inner diameter of the first channel outlet portion 945. Moreover, the inner diameter of the first channel tapered portion 940 may not be continuous due to the inwardly the outwardly tapered surfaces. For example, the first channel tapered portion 940 have a diameter of about 2 inches to about 3 inches. In some embodiments, the largest inner diameter of the first channel tapered portion 940 may be about 2.96 inches. The length of the first channel tapered portion 940 may be about 3 inches.

Internally, the second low profile FCD component 905 have a second channel 955 that is generally concentric. The first channel 910 and the second channel 955 make up the internal concentric channel of the low profile FCD 200. The second channel 955 may have a second channel inlet portion 960 to receive any steam from the first channel 910 that did not exit from the nozzles 300. The second channel inlet portion 960 may be adjacent to a second tapered channel portion 965. The second tapered channel portion 965 may have inwardly and outwardly tapered surfaces corresponding to the reduced diameter are at about 15 degrees respective inclines or declines. In some embodiments, the second tapered channel portion 965 may have surfaces that correspondence with different angles, such as about 15 degrees to about 45 degrees. The second channel inlet portion 960 may be adjacent to the second tapered channel portion 965, and the second tapered channel portion 965 is adjacent to the second channel outlet portion 970. The steam flows through the second channel inlet portion 960, through the second tapered channel portion 965, and through the second channel outlet portion 970 to the next coupled item (e.g., tubing joint, pup joint, another low profile FCD, conventional FCD, etc.). The second channel outlet portion 970 may correspond with a low profile FCD outlet end 975. The low profile FCD inlet end 950 and the low profile FCD outlet end 975 may include threads for coupling the low profile FCD 200 with other items. When the first low profile FCD component 900 and the second low profile FCD component 905 are welded together, or otherwise coupled, the first channel 910 and the second channel 955 are aligned, as illustrated in FIGS. 9 and 10A.

A cut-away at the low profile FCD outlet end 975 may be similar to that illustrated in FIG. 12. In some embodiments, the inner diameters of the second channel inlet portion 960, the second channel tapered portion 965, and the second channel outlet portion 970 of the second low profile FCD component 905 may be similar to the inner diameters of the corresponding items in the first low profile FCD component 900. In some embodiments, the inner diameters of the second channel inlet portion 960, the second channel tapered portion 965, and the second channel outlet portion 970 of the second low profile FCD component 905 may be smaller than the inner diameters of the corresponding items in the first low profile FCD component 900. For example, the low profile FCD outlet end 975 is illustrated with a smaller outer diameter then the rest of the second low profile FCD component 905.

In some embodiments, the second channel inlet portion 960 may have an inner diameter of about 1.75 inches throughout its length. The length of the second channel inlet portion 960 may be about 6 inches to about 10 inches. In some embodiments, the second channel outlet portion 970 may have an inner diameter of about 3.83 inches throughout its length. The length of the second channel outlet portion 970 may be about 4 inches to about 6 inches. In some embodiments, the second channel tapered portion 965 may have an inner diameter that is higher that the inner diameter of the second channel inlet portion 960 and lower than the inner diameter of the second channel outlet portion 970. Moreover, the inner diameter of the second channel tapered portion 965 may not be continuous due to the inwardly and outwardly tapered surfaces. For example, the largest diameter of the second channel tapered portion 965 may be about 2.94 inches. The length of the second channel tapered portion 965 may be about 3 inches to about 5 inches.

FIGS. 13-19 illustrate another embodiment of a low profile FCD for use in steam injection. The main differences between the low profile FCD 200 and the low profile FCD 1300 of FIGS. 13-19 are the following: (1) a slot for receiving a plurality of items (e.g., two nozzles, two plugs, or a nozzle and a plug) and (2) a generally eccentric channel. The low profile FCD 1300 may be used in place of the low profile FCD 155 that is illustrated in FIG. 1.

Turning first to the difference in slot, the low profile FCD 1300 includes a first low profile FCD component 1305 (e.g., similar to the first low profile FCD component 900) and a second low profile FCD component 1310 (e.g., similar to the second low profile FCD component 905) that may be welded together at line C. Each of the first low profile FCD component 1305 and the second low profile FCD component 1310 may have a length of about 10 inches to about 15 inches. In some embodiments, each of the first low profile FCD component 1305 and the first low profile FCD component 1305 may have a length of about 10 inches to about 12 inches. In some embodiments, each of the first low profile FCD component 1305 and first low profile FCD component 1305 may have a length of about 10.75 inches. When the components 1305 and 1310 are welded along line C, the low profile FCD 1300 may have a length of about 20 inches to about 30 inches, such as a length of about 21.50.

Split across the first low profile FCD component 1305 and the second low profile FCD component 1310 is a slot 1315. The slot 1315 is similar to the slot 215 and includes an opening portion 1320 (e.g., similar to the opening portion 225) that is large enough to accommodate a tool, a steam pathway portion 1325 (e.g., similar to the steam pathway portion 250), and a deflection portion 1330 (e.g., similar to the deflection portion 255). The opening portion 1320 is split across the components 1305 and 1310 just like the opening portion 225 of low profile FCD 200. The opening portion 1320 may have a length of about 2 inches to about 3 inches. In some embodiments, the opening portion 1320 may have a length of about 1.50 inches. The steam pathway portion 1325 can also include at least one side wall 1346, such as side walls 260, 265 of the low profile FCD 200. The steam pathway portion 1325 may have a length of about 1 inch to about 2 inches. In some embodiments, the steam pathway portion 1325 may have a length of about 1.51 inches.

However, those of ordinary skill in the art will appreciate that the first low profile FCD component 1305 includes a plurality of openings 1335 (e.g., similar to the opening 220) in an opening wall 1340 (e.g., similar to the opening wall 230) for receiving a plurality of items. For example, the openings 1335 may receive two nozzles that are the same, such as two of the nozzles 300, as illustrated in FIG. 13. Alternatively, the openings 1335 may receive two nozzles that are different, for example, receive the nozzle 300 and the nozzle 400, or receive a nozzle with one throat size and another nozzle with a different throat size. The plurality of openings 1335 allow practically any combination of items to be used. At least one passageway may be adjacent to each opening 1335, such as a first passageway 1336 with an outward angle of about 15 degrees and a second passageway 1337. In some embodiments, the first passageway 1336 may have a length of about 2 inches to about 3 inches and the second passageway 1337 may have a length of about 3 inches to about 4 inches. For example, the second passageway 1337 may have a length of about 3.68 inches. Furthermore, those of ordinary skill in the art will appreciate that the opening portion 1320 may or may not have any side walls. The opening portion 1320 is illustrated in FIG. 13 without any side walls. Furthermore, those of ordinary skill in the art will appreciate that the slot 1315 may or may not include a partition wall in the steam pathway portion 1325. For example, FIG. 13 illustrates a partition wall 1345 that divides the steam pathway portion 1325 into two pathways and divides the deflection portion 1330 into two deflection areas. Therefore, the partition wall 1345 causes the steam exiting one nozzle to flow along its own pathway and deflection area, and causes the steam exiting the other nozzle to flow along its own pathway and deflection area. The partition wall 1345 is not present in the embodiment illustrated in FIG. 20, which illustrates a low profile FCD 2000 (e.g., similar to the low profile FCD 1300) with a second low profile FCD component 2005 (e.g., similar to the second low profile FCD component 1310) with a deflection pathway 2010 (e.g., similar to the deflection pathway 1330) that does not have a partition wall. The low profile FCD 2000 may be used in place of the low profile FCD 155 that is illustrated in FIG. 1.

Turning next to the difference in channel, the low profile FCD 1300 includes a first channel 1350 that is generally eccentric within the first low profile FCD component 1305, instead of the generally concentric channel of the low profile FCD 200. The low profile FCD 1300 also includes a second channel 1360 that is generally eccentric within the second low profile FCD component 1310. When the two components are aligned to form the slot 1315 and welded together, as in FIG. 13, steam may enter the low profile FCD 1300 at a low profile FCD inlet end 1355 of the first low profile FCD component 1305, flow through the first channel 1350 and exit out of the nozzles as appropriate, flow through the second channel 1360, and exit out of a low profile FCD outlet end 1365 of the second low profile FCD component 1310. The first channel 1350 and the second channel 1360 make up the eccentric channel of the low profile FCD 1300. The low profile FCD inlet end 1355 and the low profile FCD outlet end 1365 may include threads for coupling the low profile FCD 1300 with other items. Each of the low profile FCD inlet end 1355 and the low profile FCD outlet end 1365 may have a length of about 2 inches to about 4 inches. In some embodiments, each of the low profile FCD inlet end 1355 and the low profile FCD outlet end 1365 may have a length of about 2.63 inches.

Figure 18A:
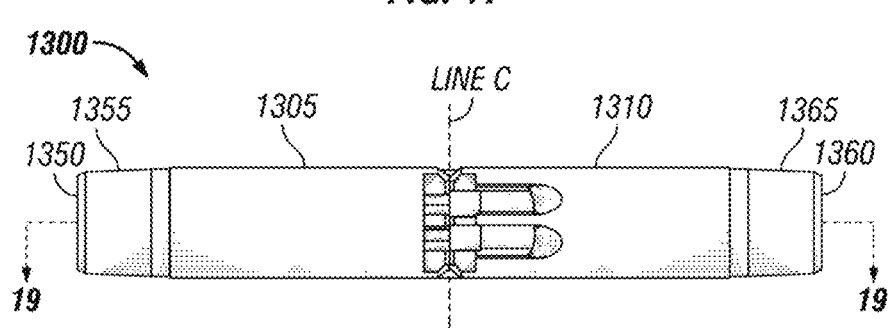
FIG. 18A illustrates a top view of the low profile FCD of FIG. 13.
Figure 18B:
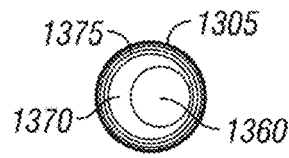
FIG. 18B illustrates a cut-away at a low profile FCD outlet end of the low profile FCD of FIG. 13.
Figure 19:
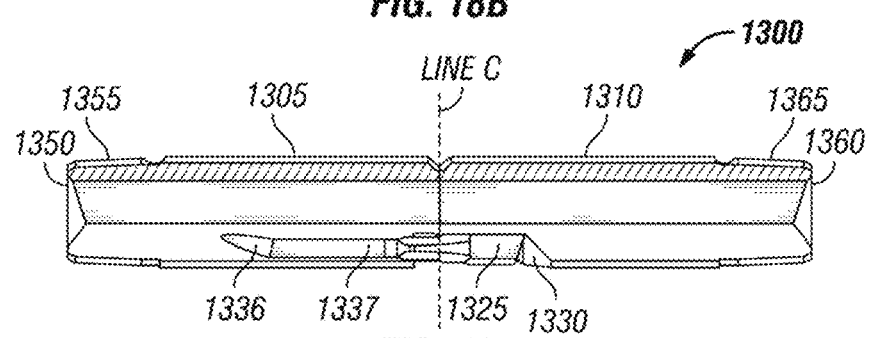
FIG. 19 illustrates a cross-sectional view (lengthwise) of the low profile FCD of FIG. 13.

FIG. 18B illustrates a cut-away at the low profile FCD inlet end 1355 of the low profile FCD of FIG. 1300. FIG. 19 illustrates a cross-sectional view (lengthwise) of the low profile FCD 1300 of FIG. 18A at line D of FIG. 18A. In some embodiments, the first channel 1350 has an inner diameter of about 1 inch to about 2 inches throughout its length. In some embodiments, the first channel 1350 has an inner diameter of about 1.75 inches throughout its length. The length of the first channel 1350 may be about 10 inches to about 12 inches. In some embodiments, the length of the first channel 1350 may be about 10.75 inches. In some embodiments, a first channel lip 1370 may have an inner diameter of about 2 inches to about 3 inches. In some embodiments, the first channel lip 1370 may have an inner diameter of about 2.468 inches. The length of the first channel lip 1370 may be about 2 inches to about 3 inches. In some embodiments, a first channel threaded portion 1375 may have a smaller outer diameter of about 3 inches to about 4 inches. In some embodiments, the first channel threaded portion 1375 may have a smaller outer diameter of about 3.125 inches. The length of the first channel threaded portion 1375 may be about 4 inches to about 6 inches. In some embodiments, the length of the first channel threaded portion 1375 may be about 4.25 inches. In some embodiments, the outermost diameter of the first low profile FCD component 1305 is about 3 inches to about 4 inches throughout its length. In some embodiments, the outermost diameter of the first low profile FCD component 1305 is about 3.20 inches throughout its length. The length of the first low profile FCD component 1305 may be about 10 inches to about 12 inches. In some embodiments, the length of the first low profile FCD component 1305 may be about 10.75 inches. A cut-away at the second low profile FCD component 1310 may illustrate similar diameters and lengths as those discussed in connection of FIG. 18B.

Mixer:

In some embodiments, at least one mixer can be part of the tubing or liner, and the mixer may be connected to a FCD and steam flows through the mixer towards the FCD. The mixer is typically installed immediately upstream of the FCD. For example, at least one static mixer with internal crisscross threading can be part of a tubing, such as the tubing 145. The static mixer with the internal crisscross threading can be connected upstream of a conventional FCD, a low profile tubing-deployed FCD (e.g., the low profile FCD 200, the low profile FCD 1300, the low profile FCD 2000, a low profile FCD with a concentric channel, a low profile FCD with an eccentric channel, etc.), a liner-deployed FCD, or another item (e.g., another item in the tubing 145). At least one static mixer with internal crisscross threading may be connected upstream of the conventional FCD or the low profile FCD in the tubing. In some embodiments, two or more of the static mixer with internal crisscross threading may be connected upstream of a particular conventional FCD or a particular low profile FCD in the tubing. The static mixer with internal crisscross threading can be connected directly to an FCD, or at least one component may be connected in between the static mixer with internal crisscross threading and an FCD. In some embodiments, at least one static mixer with internal crisscross threading is connected directly upstream of a low profile FCD with an internal eccentric channel (e.g., the low profile FCD 1300 and/or the low profile FCD 2000). In some embodiments, the static mixer with crisscross threading is coupled upstream of a flow control device, and the flow control device is deployed in a tubing, a liner, or a casing.

Examples of flow control devices that can be used in tubing deployment are disclosed in U.S. Pat. Nos. 7,350,577 and 9,022,119, which are incorporated herein by reference. An example of a low profile flow control device that can be used in tubing deployment, and a mixer with internal crisscross threading, is discussed in U.S. Non-Provisional patent application Ser. No. 15/080,199 filed with the same title and on the same date as the present disclosure, which is incorporated herein by reference in its entirety.

Examples of flow control device that can be used in liner or casing deployment may be the following commercially available flow control devices: Absolute Completion Technologies' Premium Port, Baker Hughes' Equalizer, Halliburtons' Equalizer, and RGL's FCJ, PCJ, and SCP. Of note, laboratory investigations in the horizontal steam injection test facility have confirmed that non-uniform phase splitting or wet steam can occur. Correction and improvement of this non-uniform phase splitting can be improved (or corrected) with the mixer with internal crisscross threading incorporated by reference herein. This mixer with internal crisscross threading improves phase splitting of wet steam for both liner-deployed and tubing-deployed flow control devices. The mixer with crisscross threading could be deployed upstream of the following commercially available liner deployed flow control devices: Absolute Completion Technologies' Premium Port, Baker Hughes' Equalizer, Halliburtons' Equalizer, and to RGL's FCJ, PCJ, and SCP. The mixer with crisscross threading improves phase splitting of wet steam for horizontal, inclined, and vertical wellbore geometries. The mixer with crisscross threading can also be coupled to tubing deployed FCDs.

Examples of packers that can be used are disclosed in U.S. Pat. No. 8,109,340 and US Patent Publication Nos. 2014/0196914, 2014/0041858, and 2013/0160996, which are all incorporated herein by reference in their entirety. An example of a packer with a primary sealing element and a secondary sealing element that can be used is discussed in U.S. Non-Provisional patent application Ser. No. 15/080,194 filed with the same title and on the same date as the present disclosure, which is incorporated herein by reference in its entirety.

The internal crisscross threading can be comprised of threads, grooves, or channels. These threads, grooves, or channels may be formed by threading, machining, or milling operations. The internal crisscross threading, grooving, or channeling may be created by starting with a tubular having an internal channel. The tubular may be formed of K-55, L-80, L-80 IRP, T-95, stainless steel, and surface hardened steels with processes such as carburizing, nitriding, carbonitriding, nitrocarburizing, boriding, and titanium-carbon diffusion. A first thread, groove, or channel may be machined on the surface of the internal channel along the length of the tubular towards the right. A second thread, groove, or channel may be machined on the surface of the internal channel along the length of the tubular towards the left (or towards the right if the tubular is flipped around). For simplicity, the term "threading", "threads", "threaded" or the like will be used. The threads may be machined along the entire length of the tubular, or machined along less than the entire length of the tubular. The two threads should crisscross resulting in protrusions (e.g., in a diamond shape) in areas that are not threaded. The resulting tubular is one embodiment of the static mixer with internal crisscross threading (or grooving or channels).

Regarding dimensions of the static mixer with internal crisscross threading, the pitch of the threads will be a function of the internal pipe diameter. The typical pitch or distance between threads, grooves, or channels will be between about 2 inches and about 12 inches. In some embodiments, the crisscross threading intersect in angle, and the angle is in a range of about 60 degrees to about 90 degrees. The length of the static mixer with internal crisscross threading may be about 6 inches to about 24 inches. The outermost diameter of the static mixer with internal crisscross threading may be about 2⅞ inches to about 7 inches. In some embodiments, the static mixer with internal crisscross threading is also of a low profile (flush) type and has an outermost diameter that is less than, equal to, or slightly above the outermost diameter of the tubing (or FCD). However, if the outermost diameter of the static mixer with internal crisscross threading is slightly over, the outermost diameter of the static mixer with internal crisscross threading should not be large enough to create a hang-up shoulder when inserting or pulling the tubing in the wellbore. In some embodiments, the minimum internal diameter of the mixer shall not be smaller than the internal diameter of the FCD. Typical FCD internal diameters shall range from about 1¼ inches up to about 6¼ inches.

Advantageously, the internal crisscross threading of the static mixer increases the roughness within the static mixer in order to strip liquid or water out of the steam passing through the static mixer as the steam flows towards an FCD. This stripping of liquid off the pipe wall creates chaotic mixing and more homogeneous mixture prepared for entry into the FCD inlet or entry ports. For example, FCDs with small outermost diameters (e.g., less than 3½ inches) installed in a tubing may rely on internal eccentric channels when using threaded nozzles, but the eccentric channels may result in non-uniform steam splits of vapor and liquid. Furthermore, FCDs are extremely sensitive to the orientation of the nozzle exit ports. Nozzle exit ports that are on the low-side of the wellbore (e.g., in the horizontal section 115 of the wellbore 105) may be dominated by the liquid phase and nozzle entry ports that are on the high-side of the wellbore (e.g., in the horizontal section 115 of the wellbore 105) may be dominated by the vapor dominated by the steam phase. The static mixer with internal crisscross threading provided herein may be utilized to address non-uniform steam splits of vapor and liquid, especially for FCDs with eccentric channels.

The static mixer with internal crisscross threading alters the stratified vapor-liquid steam flow into a mist flow regime to create improved phase splitting. For example, the crisscross threading strips both liquid and vapor from the surface of the internal channel of the static mixer creating mixing and the mist flow regime. Testing has confirmed that use of the static mixer with crisscross threading may result in measurable improvement in vapor and liquid phase splitting when it is installed directly upstream of the low profile FCD 1300 with an eccentric channel.

Figure 21:
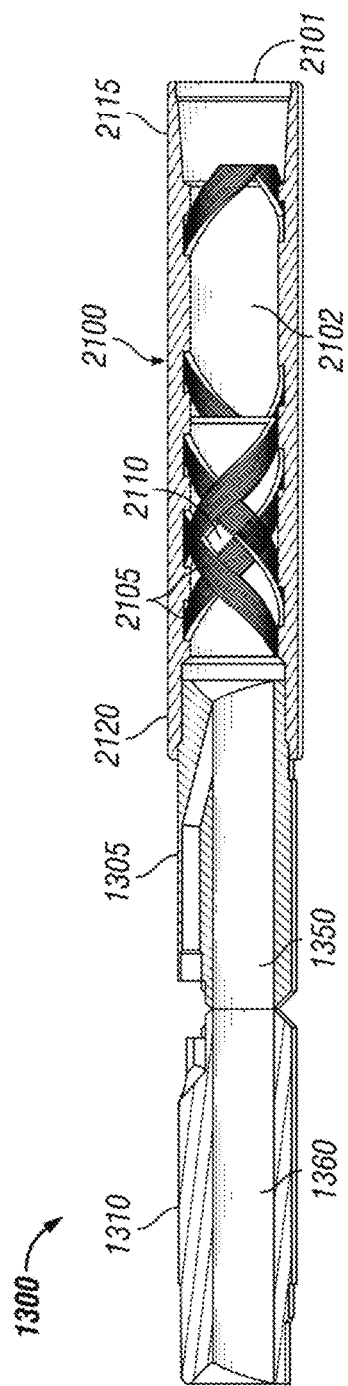
FIG. 21 illustrates a cross-sectional view (lengthwise) of one embodiment of a static mixer with internal crisscross threading for use in steam injection.
Figure 22:
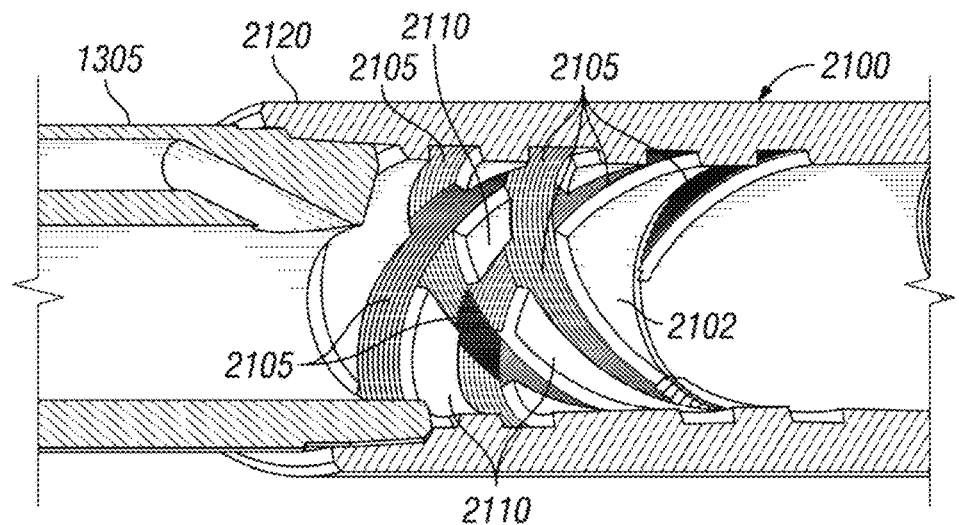
FIG. 22 illustrates a more detailed view of the static mixer with internal crisscross threading of FIG. 21.

FIG. 21 illustrates a cross-sectional view (lengthwise) of one embodiment of a static mixer with internal crisscross threading 2100 (hereinafter "mixer 2100") for use in steam injection. FIG. 22 illustrates a more detailed view of the embodiment of a static mixer with internal crisscross threading of FIG. 21. The mixer 2100 is connected upstream of the low profile FCD 1300. The mixer 2100 is connected to the first low profile FCD component 1305 (e.g., at the low profile FCD inlet end 1355), and the first low profile FCD component 1305 is connected to the second low profile FCD component 1310. The components 1305 and 1310 make up the low profile FCD 1300 with the eccentric channel (i.e., the eccentric channel is made up of the first channel 1350 and the second channel 1360). Steam flows through the mixer 2100 towards the first low profile FCD component 1305.

The mixer 2100 includes an internal channel 2101 with a surface 2102. Crisscross threading 2105 is added to the surface 2102 of the internal channel 2102 resulting in a plurality of protrusions 2100. The protrusions 2100 have a diamond shape. The pitch of the crisscross threading 2105 may be about 2 inches to about 12 inches. The protrusions 2100 may have the following height dimensions: about 0.1 inches to 0.25 inches. The overall mixer 2100 length may be about 10 to about 24 inches. The mixer 2100 may also include a mixer inlet end 2115 and a mixer outlet end 2120, each of which may include threads for connecting to other items. The crisscross threading 2105 of the mixer 2100 increases the roughness within the mixer 2100 in order to strip liquid or water out of the steam passing through the mixer 2100 as the steam flows towards the low profile FCD 1300.

Figure 23:
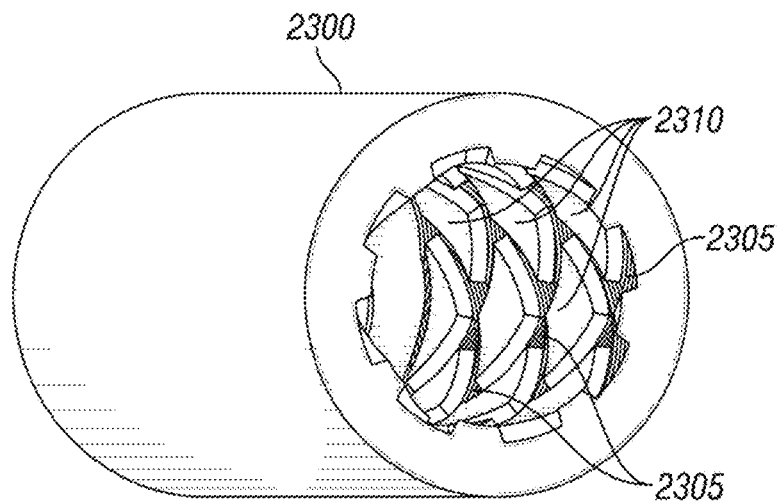
FIG. 23 illustrates another embodiment of a static mixer with internal crisscross threading for use in steam injection.

FIG. 23 illustrates another embodiment of a static mixer with internal crisscross threading 2300 (hereinafter "mixer 2300") for use in steam injection. The mixer 2300 may be similar to the mixer 2100. As illustrated, crisscross threading 2305 has pitch of about 3 inches to about 6 inches. A plurality of protrusions 2310 are also illustrated, and the protrusions 2310 have the following height dimensions: about 0.1 inches to about 0.25 inches.

FIG. 24 illustrates another embodiment of a static mixer with internal crisscross threading 2400 (hereinafter "mixer 2400") for use in steam injection. The mixer 2400 may be similar to the mixer 2100. As illustrated, crisscross threading 2405 has pitch of about 3 inches to about 6 inches. A plurality of protrusions 2410 are also illustrated, and the protrusions 2410 have the following height dimensions: about 0.1 inches to about 0.25 inches.

Those of ordinary skill in the art will appreciate that various modifications may be made to the static mixer with internal crisscross threading and the claims are not limited to the embodiments provided herein. For example, in some embodiments, the number of protrusions may vary. Alternatively, in some embodiments, the first threading may be a first type and the second threading may be of a second type, which in turn may affect the dimensions of the protrusions. Furthermore, the static mixer with internal crisscross threading can be used in other contexts outside of steam injection, for example, in another context where it is desire to strip liquid or water from gas.

Sealing Assembly for a Packer:

In some embodiments, a plurality of packers can be part of a tubing, and the packers can be used to create a plurality of wellbore segments. The wellbore segments are created when a packer creates a hydraulic seal in the tubing-liner or tubing-casing annulus. There are multiple types of packers that can be used for hydraulic isolation of steam to create wellbore segments. The three most common types of packers include: a) slip and cone packers that use mechanical, hydraulic, or thermal forces to activate the packer sealing element to create a hydraulic seal and also causes the slips to engage the casing or liner inside diameter and lock the packer and sealing elements in place, b) swellable packers where the sealing elements expand and create a seal, the swelling action that creates the seal is due to exposure to water, steam, oil, temperature, or a combination of the foregoing, and c) cup packers that have an interference fit with the casing or liner internal diameter and the sealing element is activated by differential pressure across the sealing element to create a hydraulic seal. An interference fit is defined as a sealing element that has an outside diameter that is slightly larger than the inside diameter of the casing or liner. Typical interference values for oilfield cup packer sealing elements are 0.01 to 0.10 inches, with the interference value describing how much larger the sealing outside diameter is than the inside diameter of the liner or casing.

The packer sealing elements described in this specification are intended for application in all type of packers used for creating wellbore segments. One example embodiment is the use of the packer sealing elements in a cup packer. Cup packers are comprised of four basic elements: 1) a hollow mandrel tube, 2) sealing elements rings or cups that slide onto the hollow mandrel tube, 3) thimbles that limit deformation of the packer sealing elements, and 4) retaining lock rings that fix the sealing elements and thimbles on the mandrel. The hollow mandrel tube, thimbles, and retaining lock rings are typically formed from API steels such as K-55, L-80, L-80 IRP and T-95, but may also use corrosion resistant alloys such as Inconel® 825, Alloy 25, and stainless steels.

For example, provided herein is a sealing assembly for a packer with a primary sealing element having a grove and a secondary sealing element constrained by the groove in the primary sealing element, and therefore, the packer maintains a hydraulic seal when the steam temperature is high (e.g., above 300° F.). Packers with this sealing assembly can be part of a tubing, such as the tubing 145, and installed at a variety of locations and in a variety of orientations, such as in the annulus 169 between the tubing 145 and the liner 130 (or the casing 125). A packer with this sealing assembly, sometimes referred to as a high temperature packer herein, is more likely to improve steam injection placement and improve hydrocarbon recovery. An example embodiment packer with this sealing assembly may be a cup or ring sealing element. The primary sealing element is typically extruded over a metal reinforcing structure or petal basket which limits deformation and increases the differential pressure capability of the primary sealing element.

The sealing assembly for the packer may employ a multi-part design with contrast in ductility/high-temperature tolerance characteristics. For example, a portion of the sealing assembly may be of one material that is rigid or stiff to retain the shape, and another portion of the sealing assembly may be of one material that is flexible (or less rigid) to allow for shape deformation. The materials have different thermal creep and different Shore durometers to create a more effective (less leaking) and more reliable hydraulic seal. For example, the majority of the sealing assembly may be comprised of the harder and higher Shore durometer material and a minority of the sealing assembly is comprised of the softer and lower Shore durometer material.

The primary sealing element that is comprised of less flexible and harder material is positioned in the packer hollow mandrel tube, such as in a location of the mandrel tube body and is supported by a steel thimble which limits deformation. The secondary sealing element comprised of more flexible material with a high creep and lower Shore durometer material is set in a groove or channel of the primary sealing element with the less flexible and harder material, thus providing a secondary seal for improved hydraulic seal reliability. The more rigid primary sealing element with low creep and a higher Shore durometer value serves to provide an initial primary seal and restrict the creep and extrusion of the flexible material of the secondary sealing element in the groove of the higher Shore durometer of the primary sealing element. Also, the higher Shore durometer primary sealing element may be adjacent to at least one thimble (also know as a backup ring) to keep the primary sealing element in position. Multiple primary sealing elements may be used as part of a packer design. Primary sealing elements would utilize thimbles to limit deformation and retaining lock rings to fix their position on the hollow mandrel tube. In some embodiments, the packer body may further be comprised of a plurality of parts (e.g., slip, cone, and ratchet-pawl assemblies). In some embodiments, at least some of the plurality of parts making up the packer body may be adhered or otherwise coupled to each other.

In some embodiments, the material of the secondary sealing element of the groove may have a different thermo-plastic response at elevated temperatures above 300 F. The different thermo-plastic response of the materials (e.g., a high temperature material such as Grafoil™ or Grafoil™ composite, Viton™ material, Kalrez® material, Teflon™ material, Teflon™—silica blended compounds, EPDM (ethylene-propylene diene monomer), AFLAS™ copolymer of tetrafluoroethylene and propylene rubber, carbon nanotube material, etc.) creates a better seal than a single material. The different thermo-plastic response of each material effects the materials flexibility. Material flexibility can be quantified with the Shore durometer D scale. The Shore durometer D Scale value may be about 10 to about 100 for the flexible material of the secondary sealing element. The flexible material may tolerate temperatures in a range of about 300° F. to about 850° F. Compounds such as Kalrez®, Viton™, Aflas may not perform well for long periods above 400° F., and higher temperature compounds such as Graphene, Grafoil™, Teflon™ material, Teflon™—silica blended compounds may be used for hydraulic sealing element integrity above 400° F. In some embodiments, the higher temperature flexible material compounds comprising the secondary sealing element, for example, may tolerate temperatures of 600° F. As such, the flexible material element of the secondary sealing element in the groove forms a high temperature seal.

In some embodiments, the primary sealing element uses a lower creep and higher Shore durometer material (e.g., PTFE, silica-infused PTFE, 40% glass filled Teflon™, etc.) relative to the flexible material of the secondary sealing element of the groove of the primary sealing element. In one embodiment, the Shore durometer D value may be about 70 to about 100 for the rigid material of the primary sealing element. The rigid material may tolerate temperatures in a range of about 400° F. to about 700° F. In one embodiment, the rigid material of the primary sealing element may tolerate maximum temperatures of 700° F.

In some embodiments, the primary sealing element uses a lower creep and higher Shore durometer material (e.g., PTFE, silica-infused PTFE, 40% glass filled Teflon™, etc.) relative to the flexible material of the secondary sealing element of the groove of the primary sealing element. In one embodiment, the Shore durometer value may be about 10 to about 50 for the primary sealing element of the sealing assembly. The secondary sealing element of the sealing assembly may tolerate temperatures in a range of about 400° F. to about 550° F. In one embodiment, the secondary sealing element of the sealing assembly may tolerate temperatures of 600° F.

In some embodiments, the primary sealing element may represent about 90% to about 95% of the seal element volume, with the secondary sealing element occupies the balance of the seal volume.

The groove within the primary sealing element may have a variety of shapes. In one embodiment, the groove has a shape of a square. In one embodiment, the groove has a shape of a rectangle. In one embodiment, the groove has a shape of circle or a curved shape, such as a semi-circular shape. In one embodiment, the groove has a shape of a trapezoid, and so on.

In some embodiments, the shape of the flexible material secondary sealing element may be responsive to the shape of the groove. For example, if the groove has a square shape, then the flexible material secondary sealing element may have a corresponding square shape. However, in some embodiments, the shapes do not have to be corresponding. For example, the groove may have a square shape, but the flexible material secondary sealing element may have a circular shape or other non-square shape. In some embodiment, the flexible material secondary sealing element may also include spacers, multiple shapes, a stack, etc. The secondary sealing element may also have a shape that is responsive to the thimble and hollow mandrel tube. For example, various shapes, in cross-sections, are illustrated in FIGS. 25-30, but the claims are not limited to these illustrated shapes.

Regarding dimensions, in some embodiments, the groove may have the following dimensions: 0.1 to 1 inch high and 0.2 to 0.6 inches thick. In some embodiments, the flexible material secondary sealing element for a cup packer may have the following for API 7" 23 pound per foot casing: 6.35 inches outside diameter, 3.5 inches of inside diameter, and a height of 6.00 inches. In some embodiments, the primary sealing element for a cup packer may have the following dimensions for API 5½ inch, 17 pound per foot casing: 4.91 inches outside diameter, 2.875 inches of inside diameter, and a height of 5.00 inches. The dimensions of primary or secondary sealing elements may also be responsive to the dimensions of another packer component, for example, the dimensions of the flexible material secondary element may depend on the dimensions of the groove in the primary sealing element. The dimensions of one or more of the items of the packer assembly may also depend on the dimensions of the wellbore 105, the tubing 145, the casing 125, the liner 130, etc., especially because each packer is meant to create a hydraulic seal.

Packers with flexible material secondary sealing elements may be constructed out of commercially available cup packers. Examples of pre-existing packers that can be used are disclosed in U.S. Pat. No. 8,109,340B2 and US Patent Publications Nos. US20140196914A1, US20140041858A1, and US20130160996A1, which are all incorporated herein by reference in their entirety. A pre-existing cup packer primary sealing element can be machined to create at least one groove for the placement of the flexible material secondary sealing element (e.g., a ring shaped element, an O-ring shaped element, chevron (V-shaped) seal stack, a seal stack, etc.). The groove can be machined around the circumference of the pre-existing cup packer primary sealing element. Alternatively, a packer with a flexible material sealing element does not need to be made from a pre-existing cup packer. Regardless of the manufacturing methodology, as discussed herein, the flexible material secondary sealing element may be a high temperature type material capable of handling temperature of more than 500° F., such as glass filled (40% or more) polytetrafluoroethylene (PTFE), or elastomer materials.

Thermal packers and their associated sealing elements may have the flexibility to accommodate penetration(s) that allow capillary tubes for surveillance or control lines to pass through the packer sealing elements in the downhole steam environment. The packer sealing element penetrations are typically designed for ¼ inch outside diameter capillary tubes, but the diameters could be from 0.10 inches to 0.5 inches. There are three methods that have been used penetrate packer sealing elements which are:

One option is to pass the capillary tube through a close clearance drilled hole in the packer sealing assembly. This technique has limitations, the most significant limitation is the requirement to lay out the fiber on a horizontal surface and then thread each packer sealing element hundreds to thousands of feet to the desired packer sealing element setting depth in the wellbore.

Alternatively, the capillary tube can be cut above or below the packer sealing assembly and then rejoined with Swage Lok® connectors. This technique is applicable for pumped fibers and does not allow the use of permanently installed optical fiber(s) inside the capillary tube as the permanent optical fiber(s) would have to be cut during penetration of the packer sealing assembly. The cutting of the capillary tube and using Swage Lok® connectors introduces a new potential steam leak path (i.e., steam bypass).

Alternatively, a packer sealing assembly can be fabricated that has two parts. This two-part design provides a doorway for a capillary tube to be passed through without cutting the capillary tube. Each half of the doorway may have semi-circular groove(s) cut through the sealing assembly that then mate together to create a circular hole(s) through the sealing assembly. ¼ inch circular holes for ¼" capillary tubes are the most common mated penetration hole but other sizes are possible. This two-part doorway design does not require cutting of the capillary tube or threading the packer sealing assemblies thousands of feet to a predetermined target depth. The two-part sealing assembly design may be held together with a retaining clamp which creates a steam leak free interference fit with the two part sealing assembly and the capillary tube penetrating the sealing assembly.

While all three of the foregoing methods may be used, the two-part doorway design may be more reliable and lead to lower cost steam injection installations.

Advantageously, the flexible material secondary sealing element of the groove of the primary sealing element provides a secondary seal for improved hydraulic seal reliability while the rigid material forming the primary sealing element serves to provide an initial primary seal and restrict the creep and extrusion of the flexible material secondary sealing element of the groove. As such, the packers are more likely to maintain their integrity and hydraulic seal when steam temperature is higher (e.g., above 300° F.), as well as increase the likelihood that injected steam will remain in intended wellbore segments and heat the intended portions of the formation. Advantageously, the sealing assembly design with separate parts (e.g., primary sealing element and groove to accommodate a secondary sealing element) allows the flexible material to be easily installed during the overall configuration. Advantageously, the reduced size of the secondary sealing element groove reduces the volume and total cost of the more expensive flexible material secondary sealing elements to be used in the grooves. Further, the reduced size of the secondary sealing element groove allows reduction in the extrusion gap as the rigid material in the primary sealing element grows radially at higher temperatures.

FIGS. 25-30 illustrate cross-sectional views (lengthwise) of different embodiments of primary sealing elements with flexible material secondary sealing elements (hereinafter "sealing assembly 2500") for use in steam injection. The flexible material secondary sealing element changes throughout FIGS. 25-30. The sealing assembly 2500 may be part of a tubular of the tubing 145 and the sealing assembly 2500 is positioned around the circumference of the hollow mandrel tube. As illustrated, the primary sealing element 2505 is comprised of a plurality of parts, such as a first primary sealing element component 2510 and a second primary sealing element component 2515. The two components 2510 and 2515 may be adhered together, for example, along the horizontal separation, by an adhesive. Of note, in some embodiments, some or all adjacent items may be adhered together to further improve the overall seal provided by the sealing assembly 2500. In some embodiments, the primary sealing element 2505 may be a single component or the primary sealing element 2505 may have more than two components. At least one thimble 2520 (thimble 2520 is used for simplicity but thimble 2520 can include lock rings, retaining rings, and other items to keep the packer in place) may be positioned adjacent to the primary sealing element 2505 to keep the primary sealing element 2505 in place. As illustrated, two thimbles 2520 are positioned, one in the low pressure area (towards top of the figure) and the other in the high pressure area (towards bottom of the figure). The sealing assembly 2500 includes at least one groove 2525, and each groove 2525 may receive at least one secondary sealing element 2530. The shapes and dimensions of 2505, 2510, 2515, 2520, 2525, and 2530 may be different in other embodiments, and are not limited to the shapes that are illustrated in FIGS. 25-30.

In FIGS. 25-30, the multiple arrows along the length of the sealing assembly 2500 (radially pointing towards the casing 125 or the liner 130) show the radial growth of the rigid material (e.g., PTFE) of the primary sealing element 2505 towards the casing 125 or the liner 130, which reduces the extrusion gap for the secondary sealing element 2530 of the groove 2525. The horizontal arrows (radially pointing out from the tubing 145) show a radial growth that produces an outward force on the high temperature seal of the flexible material secondary sealing element 2530 and reduces the gap depth. The vertical arrows show the longitudinal forces which also reduce the gap volume to produce additional forces on the high temperature seal created by the secondary sealing element 2530.

Various embodiments of a sealing assembly with a primary sealing element containing a groove and a secondary sealing element are contemplated. As illustrated in FIG. 25, the groove 2525 may have a square cross-sectional shape and the secondary sealing element 2530 may have a circular cross-sectional shape. In FIG. 26, the groove 2525 may have a square cross-sectional shape and the secondary sealing element 2530 may have a square cross-sectional shape. In FIG. 27, the groove 2525 may have a rectangular cross-sectional shape and the secondary sealing element 2530 may comprise at least one secondary sealing element and at least one spacer. As illustrated in FIG. 27, two secondary sealing elements with circular cross-sectional shapes are shown with one spacer in between them. The circular shaped secondary sealing elements may be referred to as multiple O-rings. In some embodiments, the secondary sealing element may include a plurality of secondary sealing elements with or without any spacers. In FIG. 28, the groove 2525 may have a rectangular cross-sectional shape and the secondary sealing element 2530 may be a seal stack or Chevron seal. In FIG. 29, the groove 2525 may have a trapezoidal cross-sectional shape and the secondary sealing element 2530 may also have a trapezoidal cross-sectional shape. As illustrated, the right angles (e.g., 90 degrees) have been removed with the trapezoidal cross-sectional shape of FIG. 29. In FIG. 30, the groove 2525 may have a semi-circular cross-sectional shape and the secondary sealing element 2530 may also have a semi-circular cross-sectional shape. As illustrated, sharp angles have been removed with the semi-circular cross-sectional shape of FIG. 30. For example, this semi-circular or elliptical groove may optimize the expansion of the rigid material (e.g., Teflon) of the primary sealing element 2505 and maximize the force on the secondary sealing element 2530.

Those of ordinary skill in the art will appreciate that various modifications may be made to sealing assembly for a packer and the claims are not limited to the embodiments provided herein. For example, in some embodiments, the number of packers and placement may vary. A single packer with the sealing assembly is illustrated in each of FIGS. 25-30, but more of these packers can be installed. For example, these cup packer sealing elements may be installed in an opposing cup packer sealing setup in which a first sealing assembly 2500 is installed in a flipped over manner (with the long pointy end up instead down) and then a second sealing element 2500 is installed as illustrated in any of FIGS. 25-30. The two packer sealing assemblies may be installed back to back or there may be a gap in between these two sealing assemblies. Other variations may also be made.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A sealing assembly for a packer located within an annulus of a wellbore to hydraulically isolate a segment of the wellbore, the sealing assembly for the packer comprising:

a substantially tubular housing comprising a primary sealing element containing a groove; and at least one secondary sealing element disposed within the groove of the primary sealing element;

wherein the primary sealing element and the at least one secondary sealing element expand to hydraulically isolate the segment of the wellbore when the packer is actuated, and wherein the expansion of the secondary sealing element is constrained by the groove in the primary sealing element, and wherein the primary sealing element comprises a first material, the at least one secondary sealing element comprises a second material, and the first material has thermoplastic properties lower than that of the second material.

2. The sealing assembly for the packer of claim 1, wherein the primary sealing element comprises a first material, the at least one secondary sealing element comprises a second material, and the first material has a Shore durometer type D scale value greater than that of the second material.

3. The sealing assembly for the packer of claim 1, wherein the primary sealing element is comprised of a material that has a Shore durometer type D scale value ranging between about 70 to about 100.

4. The sealing assembly for the packer of claim 1, wherein the at least one secondary sealing element is comprised of a material that has a Shore durometer type D scale value ranging between about 10 to about 50.

5. The sealing assembly for the packer of claim 1, wherein the at least one secondary sealing element maintains a hydraulic seal at temperatures greater than that of the primary sealing element.

6. The sealing assembly for the packer of claim 1, wherein the primary sealing element maintains a hydraulic seal at temperatures greater than about 300 degrees Fahrenheit.

7. The sealing assembly for the packer of claim 1, wherein the at least one secondary sealing element maintains a hydraulic seal at temperatures greater than about 600 degrees Fahrenheit.

8. The sealing assembly for the packer of claim 1, wherein there are at least two secondary sealing elements disposed within the groove of the primary sealing element and the at least two secondary sealing elements have different Shore durometer type D scale values, thermoplastic properties, or a combination thereof.

9. The sealing assembly for the packer of claim 1, wherein the groove is machined into the circumference of the primary sealing element.

10. The sealing assembly for the packer of claim 1, wherein the geometry of the groove in the primary sealing element is shaped to maximize force on the at least one secondary sealing element when the primary sealing element expands.

11. The sealing assembly for the packer of claim 1, wherein the shape of the at least one secondary sealing element generally corresponds to the shape of the groove in the primary sealing element prior to the packer being actuated.

12. The sealing assembly for the packer of claim 1, wherein the shape of the at least one secondary sealing element is different compared to the shape of the groove in the primary sealing element prior to the packer being actuated.

13. The sealing assembly for the packer of claim 1, wherein the groove of the primary sealing element is formed by coupling at least two primary sealing components together.

14. The sealing assembly for the packer of claim 13, wherein the at least two primary sealing components are composed of materials having different Shore durometer type D scale values, thermoplastic properties, or a combination thereof.

15. The sealing assembly for the packer of claim 1, further comprising at least one thimble adjacent to the primary sealing element that maintains the position of the primary sealing element on a mandrel when the primary sealing element expands.

16. The sealing assembly for the packer of claim 1, further comprising at least one aperture for a capillary tube, control line, or a combination thereof to pass through.

17. The sealing assembly for the packer of claim 1, wherein the at least one secondary sealing element comprises less than about 10 percent of the volume of the primary sealing element.

18. The sealing assembly for the packer of claim 1, wherein the primary sealing element fills greater than 90 percent of a volume of the substantially tubular housing.

19. The sealing assembly for the packer of claim 1, wherein the sealing assembly for packer is disposed within a cup packer, slip and cone packer, or a swellable packer.

20. The sealing assembly for the packer of claim 1, wherein the primary sealing element forms an interference fit with a casing or a liner when the packer is actuated.

21. A wellbore assembly for delivery of steam into a formation, the wellbore assembly comprising:
(a) a flow control device for bifurcating a mixture of steam for delivery into a formation, the flow control device comprising:
a body having a tubular outer surface;
a recess formed in the tubular outer surface, the recess having an opening for receiving a nozzle, wherein the recess is sufficient in size to accommodate a tool for coupling or removing the nozzle;
the nozzle coupled to the opening such that the outermost surface of the nozzle is disposed within an outermost diameter of the tubular outer surface of the body; and
a channel within the body that is in fluid communication with the opening in the recess, wherein at least a portion of the mixture of steam received by the channel is delivered to the formation through the nozzle; and
(b) a packer containing a sealing assembly to hydraulically isolate a segment of the wellbore, the sealing assembly for the packer comprising:
a substantially tubular housing comprising a primary sealing element containing a groove; and
at least one secondary sealing element disposed within the groove of the primary sealing element;
wherein the primary sealing element and the at least one secondary sealing element expand to hydraulically isolate the segment of the wellbore when the packer is actuated, and wherein the expansion of the secondary sealing element is constrained by the groove in the primary sealing element, and wherein the primary sealing element comprises a first material, the at least one secondary sealing element comprises a second material, and the first material has thermoplastic properties lower than that of the second material.

22. The wellbore assembly of claim 21, further comprising a static mixer coupled upstream of the flow control device for creating a more homogenous mixture of steam for the flow control device, the static mixer comprising:
a body having a tubular outer surface; and
a channel within the body that is in fluid communication with a source of the steam, wherein a surface of the channel comprises crisscross threading that results in protrusions in areas that are not threaded, and wherein the protrusions and the crisscross threading create the more homogenous mixture of steam for delivery to the flow control device.

23. A sealing assembly for a cup packer located within an annulus of a wellbore to hydraulically isolate a segment of the wellbore, the sealing assembly for the cup packer comprising:
   a substantially tubular housing comprising a primary sealing element containing a groove; and
   at least one secondary sealing element disposed within the groove of the primary sealing element;
   wherein the primary sealing element and the at least one secondary sealing element expand to hydraulically isolate the segment of the wellbore when the cup packer is actuated, and wherein the expansion of the secondary sealing element is constrained by the groove in the primary sealing element, and wherein the primary sealing element comprises a first material, the at least one secondary sealing element comprises a second material, and the first material has thermoplastic properties lower than that of the second material.

* * * * *